US008737453B2

(12) United States Patent
Toriyama et al.

(10) Patent No.: US 8,737,453 B2
(45) Date of Patent: May 27, 2014

(54) CONTACTLESS COMMUNICATION DEVICE, CONTACTLESS IC CARD, AND MOBILE INFORMATION TERMINAL

(75) Inventors: Akihiro Toriyama, Kanagawa (JP); Kazuki Watanabe, Kanagawa (JP); Makoto Shindo, Kanagawa (JP); Makoto Toyoshima, Kanagawa (JP); Yosuke Tanno, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 371 days.

(21) Appl. No.: 13/294,536

(22) Filed: Nov. 11, 2011

(65) Prior Publication Data

US 2012/0120989 A1     May 17, 2012

(30) Foreign Application Priority Data

Nov. 17, 2010   (JP) ................................. 2010-257057

(51) Int. Cl.
*H03L 7/00*     (2006.01)

(52) U.S. Cl.
USPC ..... 375/219; 375/295; 340/5.63; 340/870.39; 340/660; 340/693.4; 340/658

(58) Field of Classification Search
USPC ............ 375/219, 295; 340/5.63, 870.39, 660, 340/693.4, 658
See application file for complete search history.

(56) References Cited

U.S. PATENT DOCUMENTS

| 7,168,624 | B2 | 1/2007 | Watanabe et al. |
| 2004/0246134 | A1* | 12/2004 | Collins et al. .............. 340/572.1 |
| 2005/0001718 | A1* | 1/2005 | Asauchi ..................... 340/539.3 |
| 2005/0133603 | A1* | 6/2005 | Moreaux et al. ............. 235/492 |
| 2007/0273485 | A1* | 11/2007 | Balachandran et al. ... 340/10.34 |
| 2010/0045231 | A1* | 2/2010 | He ................................. 320/108 |
| 2011/0300798 | A1* | 12/2011 | Lefley ......................... 455/41.1 |

FOREIGN PATENT DOCUMENTS

| JP | 2005-191961 A | 7/2005 |
| JP | 2006-119693 A | 5/2006 |
| WO | WO 03/091819 A1 | 11/2003 |

* cited by examiner

*Primary Examiner* — Leila Malek
(74) *Attorney, Agent, or Firm* — Miles & Stockbridge P.C.

(57) ABSTRACT

There is included a detection unit for detecting a magnitude of a surplus of a direct current to a source voltage generated by a voltage generation unit generating the source voltage from the direct current obtained by rectifying a signal inputted from an antenna terminal. A data processing unit operating at the source voltage and performing data processing on a transmission/reception signal includes a clock control unit for determining a frequency of a clock signal for the data processing based on the magnitude of the surplus current detected by the detection unit in a state where a frequency of the clock signal is set to a predetermined reference frequency. Since the power consumed by the data processing unit at the time of detecting the surplus of the direct current is determined by the specific reference frequency, the surplus of the direct current can be detected as an absolute surplus.

15 Claims, 19 Drawing Sheets

CONTACTLESS COMMUNICATION DEVICE, CONTACTLESS IC CARD, AND MOBILE INFORMATION TERMINAL

CROSS-REFERENCE TO RELATED APPLICATIONS

The disclosure of Japanese Patent Application No. 2010-257057 filed on Nov. 17, 2010 including the specification, drawings and abstract is incorporated herein by reference in its entirety.

BACKGROUND

The present invention relates to a contactless communication device and a contactless IC card which are used for electronic money, transportation ticket gates, and the like, and particularly to a technique effectively applied to e.g. a semiconductor device for an IC card.

According to the international standard ISO/IEC 14443 and ISO/IEC 18092, an IC card having a contactless interface is called a PICC and performs RF (Radio Frequency) communication with a reader/writer called a PCD. ISO stands for the International Organization for Standardization, and IEC stands for the International Electrical Commission. PICC stands for Proximity Card, and PCD stands for Proximity Coupling Device.

Transmission data from the PCD to the PICC is defined as "downstream data", and transmission data from the PICC to the PCD is defined as "upstream data". The common sequence of contactless communication is that the PICC receives downstream data from the PCD, performs internal processing, and transmits upstream data to the PCD in response to the downstream data. Repetition of the downstream data and the upstream data enables contactless communication.

In recent years, with the diversification of applications, the internal processing time (transaction time) of the PICC has been steadily increasing.

In the internal processing by the PICC, the processing time can be decreased with increasing processing speed. That is, the increase of the processing speed of the PICC enables various processes during the period between reception and transmission by the PICC. However, the consumption current of the PICC increases with the increase in the internal processing speed of the PICC. Since the power to the PICC is generated, by electromagnetic induction, from carrier waves supplied from the PCD, the communication distance for allowing contactless communication decreases with the increase in the consumption current of the PICC. Although it is possible to increase the communication distance by decreasing the consumption current of the PICC, it is necessary to decrease the internal processing speed of the PICC in order to decrease the consumption current. That is, the consumption current and processing speed of the PICC have a trade-off relationship, and the communication distance for allowing contactless communication and the processing speed have a trade-off relationship.

A contactless communication device applied to the PICC rectifies a signal inputted from an antenna terminal and supplies a direct current obtained by rectification to a regulator to generate a predetermined level of source voltage. According to WO2003/091819 (Patent Document 1), if it is determined that a direct current flowing through a voltage regulation unit as the regulator is not less than a predetermined current, control is performed so that a specific circuit such as a coprocessor can operate. According to Japanese Unexamined Patent Publication No. 2005-191961 (Patent Document 2), an operation clock frequency in an IC card is controlled in accordance with the relative magnitude relationship between a power level received by the IC card and a power level consumed in the IC card. For example, if a power level consumed in a semiconductor integrated circuit is less than the received power level by a predetermined amount, the operation clock frequency is increased. In the reverse case, the operation clock frequency is decreased. According to Japanese Unexamined Patent Publication No. 2006-119693 (Patent Document 3), the received voltage of a signal inputted to an antenna terminal is referred to for monitoring of the received energy, and by comparing the margin of the received energy with a control rule, a required processing speed is calculated to control the processing speed of a logic unit, thereby ensuring compatibility between the securing of a contactless communication distance and high-speed processing.

SUMMARY

The above patent documents describe techniques for controlling the operating speed of a central processing unit (CPU) etc. based on the detection result of the received power state. According to Patent Documents 1 and 2, the margin of the received power state can be detected, but it is merely a relative margin. At the time of increasing the clock frequency, without a comparatively large margin, it is considered that depending on the operating conditions of a peripheral circuit such as an accelerator, sufficient power is not supplied. According to Patent Document 3, in order that the detection state of the received power is not affected by the operating state of the CPU etc., it is necessary to provide a different energy monitoring unit in a path different from a power generation system including a rectifier and a regulator and to add a new circuit for determining the processing speed of the CPU etc. by comparing the sampled energy with the control rule, which increases the circuit size and the power consumption thereof.

The present inventors have studied the control of the frequency of a clock signal for determining the data processing speed of the CPU, the coprocessor, etc. based on the result of detecting a surplus of a direct current generated based on input from an antenna terminal in order to decrease the circuit size as much as possible. Particularly, in consideration of Patent Document 3, a plurality of detection circuits detect a surplus current flowing through the regulator as the surplus of the direct current to the source voltage, using different threshold values. For the frequency control of the clock signal, one clock signal is selected from among clock signals having a plurality of frequencies obtained by dividing a communication carrier frequency of 13.56 MHz. The following problems have been found in this study.

The first problem is that in the case where transmission/reception data processing is performed by the CPU, the coprocessor, etc., the surplus of the direct current changes depending on the operating frequency of the CPU etc. operating during a detection operation. That is, only a relative surplus can be detected in accordance with the operating conditions of the CPU etc. For example, in the case where the contactless communication distance is constant and the supply power from the PCD is constant, in terms of the relationship between the frequency of the CPU and the surplus current flowing through the regulator, the consumption current of the PICC increases as the frequency of the CPU is increased, and the amount of surplus current flowing through the regulator which is obtained by subtracting the consumption current of the PICC from a supply current (IPCD) from the PCD decreases as the frequency of the CPU is increased. Thus, the detection signal of the surplus current changes depending on the set value of the frequency of the CPU in operation; accordingly, it is necessary to determine a frequency up to which the frequency of the CPU can be increased while checking both the frequency of the CPU in operation and the detection signal of the surplus current, which requires time for the processing. If the CPU is used for the determination, the load on the CPU increases. Otherwise, a special logic circuit is required, which increases the circuit size. Particularly, in the determination of a frequency up to which the frequency of the CPU can be increased while checking both the frequency of the CPU in operation and the detection signal of the surplus current, it is necessary to gradually increase the frequency of the CPU. Since the consumption current of the CPU etc. increases and the surplus current decreases as the frequency of the CPU is increased, it is necessary to gradually change the frequency while repeating the detection of the surplus current. In this regard, if software of the CPU is used for the determination of a frequency up to which the frequency of the CPU etc. can be increased, the software development puts a large burden on an IC card provider.

The second problem is that if the communication distance becomes large, the frequency of the CPU needs to be decreased to ensure the normal operation. In this case as well, the processing load increases unavoidably. In addition, if the processing time is not reduced, the risk of communication inability increases.

The third problem is that it is difficult to optimize the processing speed of the CPU etc. in accordance with the surplus current. Specifically, it is not easy to estimate fluctuations in the consumption current at the time of detecting the surplus current in accordance with other CPU data processing conditions and the operating conditions of other circuit modules such as the coprocessor incorporated in the PICC, so that a comparatively large margin is required in the determination of the frequency, which is insufficient in improvement of data processing efficiency.

It is an object of the present invention to provide a contactless communication device and an IC card that can implement the control of a clock signal frequency in consideration of a surplus of a direct current generated in accordance with a communication distance, without increasing the circuit size with the reduction of the processing time and can contribute to the improvement of data processing efficiency.

The above and other objects and novel features of the present invention will become apparent from the description of this specification and the accompanying drawings.

A typical aspect of the invention disclosed in the present application will be briefly described as follows.

There is included a detection unit for detecting a magnitude of a surplus of a direct current to a source voltage generated by a voltage generation unit for generating the source voltage from the direct current obtained by rectifying a signal inputted from an antenna terminal. A data processing unit which operates at the source voltage and performs data processing on a transmission/reception signal includes a clock control unit for determining a frequency of a clock signal for the data processing based on the magnitude of the surplus detected by the detection unit in a state where a frequency of the clock signal is set to a predetermined reference frequency.

Since the power consumed by the data processing unit at the time of detecting the surplus of the direct current is determined by the specific reference frequency, the surplus of the direct current can be detected as an absolute surplus. It is possible to determine the clock signal frequency of the data processing unit in a short time without a waste with precision in comparison with detection of a relative surplus without specifying a clock frequency at the time of detection, and therefore to minimize an internal data processing time (transaction time) in a contactless communication device which performs contactless communication with outside.

Effects obtained by the typical aspect of the invention disclosed in the present application will be briefly described as follows.

It is possible to implement the control of the clock signal frequency in consideration of the surplus of the direct current generated in accordance with a communication distance, without increasing the circuit size with the reduction of the processing time and can contribute to the improvement of data processing efficiency.

DETAILED DESCRIPTION

1. Outline of Embodiments

Figure 1:
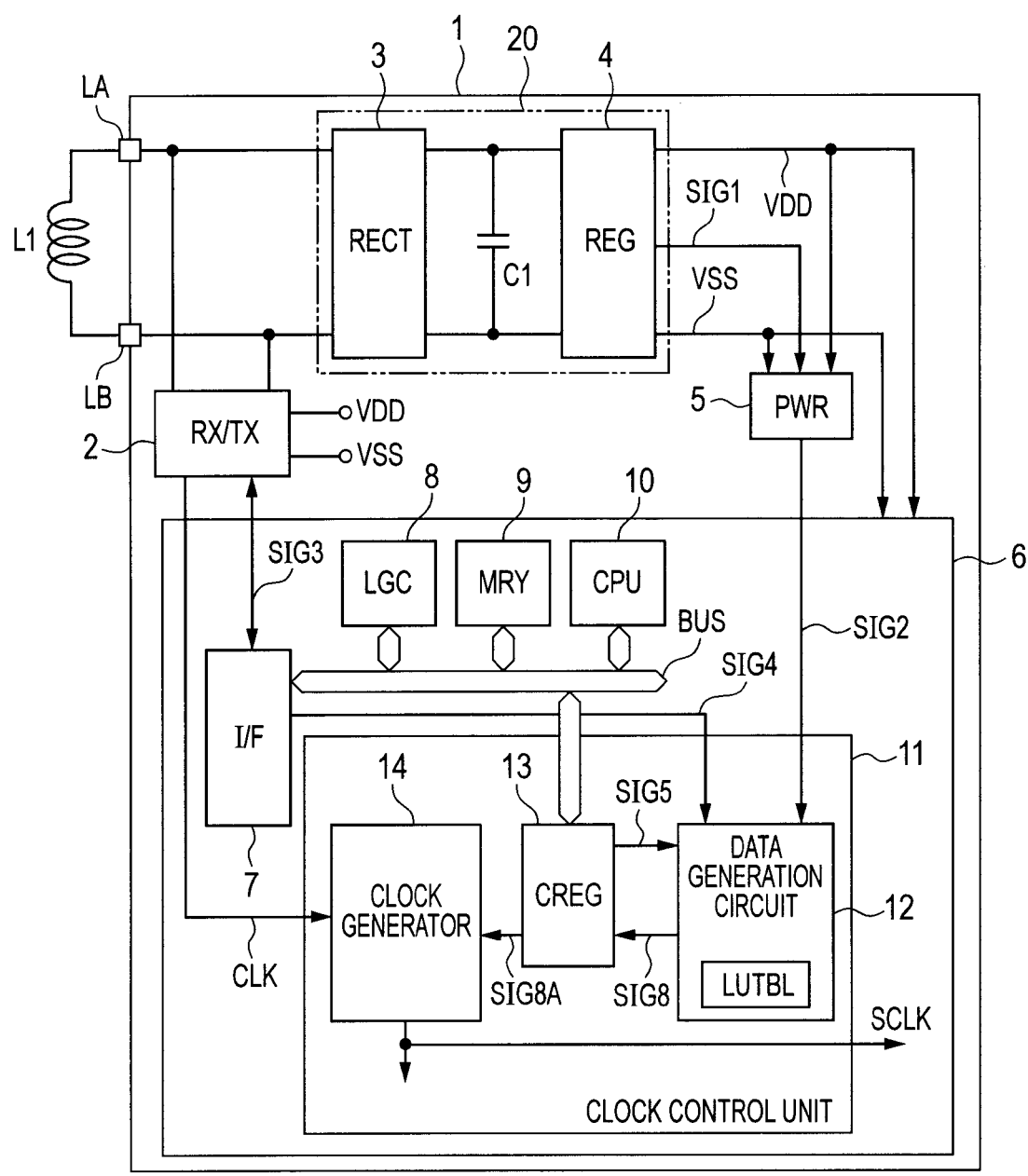
FIG. 1 is a block diagram illustrating a schematic configuration of a contactless communication device according to a first embodiment of the present invention.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] Frequency Control Based on Measurement Result of Surplus of Direct Current Independent of Operating Frequency of Data Processing Unit A contactless communication device (1, 1M) according to an exemplary embodiment of the invention has a voltage generation unit (20) for generating a predetermined source voltage (VDD) from a direct current obtained by rectifying a signal inputted from an antenna terminal (LA, LB), a transmission/reception unit (2) which operates at the source voltage generated by the voltage generation unit and performs a transmission/reception operation through the antenna terminal, a data processing unit (6, 6M) which operates at the source voltage generated by the voltage generation unit and performs data processing from a signal received and a signal to be transmitted by the transmission/reception unit and a clock signal (CLK) in synchronization with a system clock signal (SCLK), and a detection unit (5) for detecting a magnitude of a surplus of the direct current to the source voltage generated by the voltage generation unit. The data processing unit has an interface circuit (7) for passing data to and from the transmission/reception unit and a clock control unit (11, 11M) for determining a frequency of the system clock signal for the data processing based on the magnitude of the surplus detected by the detection unit in a state where a frequency of the system clock signal is set to a reference frequency.

Since the system clock signal frequency of the data processing unit is set to the predetermined reference frequency at the time of detecting the surplus of the direct current, the power consumed by the data processing unit at the time of detecting the surplus of the direct current is determined by the specific reference frequency. Accordingly, the surplus of the direct current can be detected as an absolute surplus. It is possible to determine the system clock signal frequency of the data processing unit in a short time without a waste with precision in comparison with detection of a relative surplus without specifying a system clock frequency at the time of detection. This is because it is not necessary to gradually change the frequency while repeating the detection of the surplus current. Thereby, it is possible to reduce an internal data processing time (transaction time) in the contactless communication device which performs contactless communication with outside. Further, since the detection unit detects the magnitude based on the surplus of the direct current generated in the voltage generation unit, it is not necessary to add a large circuit for the detection.

[2] Adoption of High Frequency Selectable within Surplus of Direct Current

In the contactless communication device according to item 1, the clock control unit selects the system clock signal of a high frequency within a limit permitted by the magnitude of the surplus detected by the detection unit.

It is possible to enhance the data processing speed of the data processing unit.

[3] Refer to Look-up Table

In the contactless communication device according to item 2, the clock control unit has a look-up table (LUTBL) for storing, for each detection result, frequency data of the system clock signal selected corresponding to a detection result by the detection unit, and determines the system clock signal frequency by referring to corresponding frequency data from the look-up table, using the detection result.

It is possible to simplify control for determining the system clock frequency.

[4] Execute Frequency Control in Accordance with Instruction from Interface Circuit in Low-Power Consumption State In the contactless communication device according to item 1, the data processing unit (6) takes a low-power consumption state in which the system clock signal is set to a low frequency during a transmission/reception operation performed by the transmission/reception circuit in accordance with an instruction from the interface circuit (7). In the low-power consumption state, in accordance with an instruction from the interface circuit, the clock control unit (11) increases the frequency of the system clock signal based on the magnitude of the surplus of the current detected by the detection unit and releases the low-power consumption state.

With this, it is possible to exit from the low-power consumption state to the normal operation state by increasing the system clock signal frequency in accordance with the magnitude of the surplus of the direct current detected in response to the instruction for releasing the low-power consumption state from the interface circuit; accordingly, it is possible to optimize the system clock signal frequency of the data processing unit as part of processing for releasing the low-power consumption state, thus performing the optimization of the system clock signal frequency for the received power at the start of data processing performed by the data processing unit in intervals between transmission/reception operations performed by the transmission/reception unit.

[5] Set System Clock Frequency in Low-power Consumption State to Reference Frequency In the contactless communication device according to item 4, the frequency of the clock signal is set to the reference frequency in the low-power consumption state of the data processing unit.

With this, it is possible to easily detect the magnitude of the surplus of the direct current at the reference frequency in response to the instruction for releasing the low-power consumption state from the interface circuit and exit from the low-power consumption state to the normal operation state.

[6] Execute Frequency Control in Accordance with Setting by CPU

In the contactless communication device according to item 1, the data processing unit (6M) has a central processing unit (10) for executing an instruction. The clock control unit performs processing for determining the frequency of the system clock signal based on the magnitude of the surplus detected by the detection unit in a state where the frequency of the system clock signal is set to the reference frequency in response to an instruction from the central processing unit.

It is possible to optimize the system clock signal frequency by detecting the magnitude of the surplus of the direct current at arbitrary timing in accordance with an operation program of the central processing unit.

[7] Set Register in Response to Reception Processing End Notification

In the contactless communication device according to item 6, the central processing unit sets control data in the clock control unit in response to an end notification of transmission/reception processing from the interface circuit, and the clock control unit performs a timer operation according to the set control data and performs processing for determining the frequency of the system clock signal at a timer operation start time point and a subsequent time-out occurrence time point.

With this, it is possible to perform, multiple times, the optimization of the system clock signal frequency for the received power every start and set time-out of data processing performed by the data processing unit in intervals between transmission/reception operations performed by the transmission/reception unit.

[8] Register for Enabling Timer and Setting Interval

In the contactless communication device according to item 7, the clock control unit has a register (13M) in which an enable bit (bit of SIG6) for the timer operation and a time-out interval as the control data are variably set by the central processing unit.

It is possible to arbitrarily set time-out timing and the number of time-outs in accordance with an operation program of the central processing unit.

[9] Frequency. Division of Carrier Clock Signal

In the contactless communication device according to item 1, the clock control unit has a clock generator (14) which receives a carrier clock signal generated by extracting a carrier component from the signal inputted from the antenna terminal, generate a plurality of system clock signals having different frequencies by frequency-dividing the inputted carrier clock signal, and selects and outputs a system clock signal of a frequency specified by clock selection data, a register (13, 13M) which provides stored clock selection data to the clock generator, and a data generation circuit (12, 12M) for generating clock selection data based on the magnitude of the surplus detected by the detection unit. Clock selection data generated by the central processing unit or the data generation circuit is rewritably set in the register.

It is possible to determine the frequency of the system clock signal supplied to the data processing unit based on either the clock selection data set by the central processing unit or the clock selection data set by the data generation circuit based on the magnitude of the surplus of the direct current, and therefore to determine with flexibility the system clock frequency based on the magnitude of the surplus of the direct current.

[10] Seamless Clock Switching

In the contactless communication device according to item 9, the clock generator has a counter (41, 44) for repeating an operation of counting cycles of the carrier clock signal up to a value according to a frequency dividing ratio specified by the clock selection data and a logic circuit (43, 45 to 48) for generating a system clock signal corresponding to the frequency dividing ratio in synchronization with a cycle of the carrier clock signal and in synchronization with a change to a predetermined count value of the counter in accordance with the frequency dividing ratio specified by the clock selection data.

Since each of the system clock signals having different frequency dividing ratios is generated in synchronization with the cycle of the carrier clock signal, seamless clock switching can be implemented.

[11] Voltage Generation Unit and Detection Unit

In the contactless communication device according to item 1, the voltage generation unit has a rectifier circuit (3) for rectifying the signal inputted from the antenna terminal and a regulator (4) for generating the source voltage by regulating the direct current obtained by rectification by the rectifier circuit. The detection unit generates, as the magnitude of the surplus, a signal that indicates, with a plurality of bits, a magnitude of a surplus current flowing through the regulator.

It is possible to easily obtain the magnitude of the surplus current with required accuracy.

[12] Frequency Control Based on Measurement Result of Surplus of Direct Current in Low-Power Consumption State A contactless communication device (1) according to another embodiment of the invention has a voltage generation unit for generating a predetermined source voltage from a direct current obtained by rectifying a signal inputted from an antenna terminal, a transmission/reception unit which operates at the source voltage generated by the voltage generation unit and performs a transmission/reception operation through the antenna terminal, a data processing unit (6) which operates at the source voltage generated by the voltage generation unit, generates a signal received and a signal to be transmitted by the transmission/reception unit and a clock signal (CLK), performs data processing in synchronization with a system clock signal (SCLK), and is put into a low-power consumption state in which the clock signal is set to a low frequency by an interface circuit during a transmission/reception operation performed by the transmission/reception unit, and a detection unit for detecting a magnitude of a surplus of the direct current to the source voltage generated by the voltage generation unit. In response to an instruction from the interface circuit in the low-power consumption state, the data processing unit increases the frequency of the clock signal within a limit permitted by the magnitude of the surplus detected by the detection unit and releases the low-power consumption state.

Since the system clock signal frequency of the data processing unit is set to the predetermined low frequency in the low-power consumption state at the time of detecting the surplus of the direct current, the power consumed by the data processing unit at the time of detecting the surplus of the direct current is determined by the frequency, and the surplus of the direct current can be detected as an absolute surplus. Therefore, as in item 1, it is not necessary to gradually change the frequency while repeating the detection of the surplus current, and it is possible to determine the system clock signal frequency of the data processing unit in a short time without a waste with precision. Further, since it is possible to exit from the low-power consumption state to the normal operation state by increasing the system clock signal frequency in accordance with the magnitude of the surplus of the direct current detected in response to the instruction for releasing the low-power consumption state from the interface circuit; as in item 4, it is possible to optimize the system clock signal frequency of the data processing unit as part of processing for releasing the low-power consumption state, thus performing the optimization of the system clock signal frequency for the received power at the start of data processing performed by the data processing unit in intervals between transmission/reception operations performed by the transmission/reception unit. Thereby, it is possible to reduce an internal data processing time (transaction time) in the contactless communication device which performs contactless communication with outside. Further, since the detection unit detects the magnitude based on the surplus of the direct current generated in the voltage generation unit, it is not necessary to add a large circuit for the detection.

[13] Frequency Control Based on Measurement Result of Surplus of Direct Current at Reference Frequency According to CPU Instruction A contactless communication device (1M) according to still another embodiment of the invention has a voltage generation unit for generating a predetermined source voltage from a direct current obtained by rectifying a signal inputted from an antenna terminal, a transmission/reception unit which operates at the source voltage generated by the voltage generation unit and performs a transmission/reception operation through the antenna terminal, a data processing unit (6M) which operates at the source voltage generated by the voltage generation unit, generates a signal received and a signal to be transmitted by the transmission/reception unit and a clock signal, and performs data processing in synchronization with a system clock signal (SCLK), and a detection unit for detecting a magnitude of a surplus of the direct current to the source voltage generated by the voltage generation unit. The data processing unit has a central processing unit for executing an instruction, sets a frequency of the system clock signal to a predetermined reference frequency at timing specified by the central processing unit during data processing, acquires the magnitude of the surplus from the detection unit, and selects a high or low frequency of the system clock signal within a limit permitted by the acquired magnitude of the surplus.

Since the system clock signal frequency of the data processing unit is set to the predetermined reference frequency at the time of detecting the surplus of the direct current, the power consumed by the data processing unit at the time of detecting the surplus of the direct current is determined by the reference frequency, and the surplus of the direct current can be detected as an absolute surplus. Therefore, as in item 1, it is not necessary to gradually change the frequency while repeating the detection of the surplus current, and it is possible to determine the system clock signal frequency of the data processing unit in a short time without a waste with precision. Further, as in item 6, it is possible to optimize the system clock signal frequency by detecting the magnitude of the surplus of the direct current at arbitrary timing in accordance with an operation program of the central processing unit. Thereby, it is possible to reduce an internal data processing time (transaction time) in the contactless communication device which performs contactless communication with outside. Further, since the detection unit detects the magnitude based on the surplus of the direct current generated in the voltage generation unit, it is not necessary to add a large circuit for the detection.

[14] IC Card

An IC card (60) according to still another embodiment of the invention has a board (61), an antenna formed over the board, a contactless communication circuit having an antenna terminal coupled to the antenna. The contactless communication circuit has a voltage generation unit for generating a predetermined source voltage from a direct current obtained by rectifying a signal inputted from the antenna terminal, a transmission/reception unit which operates at the source voltage generated by the voltage generation unit and performs a transmission/reception operation through the antenna terminal, a data processing unit which operates at the source voltage generated by the voltage generation unit, generates a signal received and a signal to be transmitted by the transmission/reception unit and a clock signal, and performs data processing in synchronization with a system clock signal (SCLK), and a detection unit for detecting a magnitude of a surplus of the direct current to the source voltage generated by the voltage generation unit. The data processing unit has a clock control unit for determining a frequency of the system clock signal for the data processing based on the magnitude of the surplus detected by the detection unit in a state where a frequency of the system clock signal is set to a predetermined reference frequency.

Since the system clock signal frequency of the data processing unit is set to the predetermined reference frequency at the time of detecting the surplus of the direct current, the power consumed by the data processing unit at the time of detecting the surplus of the direct current is determined by the specific reference frequency, and the surplus of the direct current can be detected as an absolute surplus. Therefore, as in item 1, it is not necessary to gradually change the frequency while repeating the detection, of the surplus current, and it is possible to determine the system clock signal frequency of the data processing unit in a short time without a waste with precision. Thereby, it is possible to reduce an internal data processing time (transaction time) in the contactless communication device which performs contactless communication with outside. Further, since the detection unit detects the magnitude based on the surplus of the direct current generated in the voltage generation unit, it is not necessary to add a large circuit for the detection.

[15] Mobile Information Terminal

A mobile information terminal (80) according to still another embodiment of the invention includes a case (81), an information processing system (82), a contactless communication device (1, 1M), and an antenna (L1) coupled to the contactless communication device. The contactless communication device has a voltage generation unit for generating a predetermined source voltage from a direct current obtained by rectifying a signal inputted from the antenna terminal, a transmission/reception unit which operates at the source voltage generated by the voltage generation unit and performs a transmission/reception operation through the antenna terminal, a data processing unit which operates at the source voltage generated by the voltage generation unit, generates a signal received and a signal to be transmitted by the transmission/reception unit and a clock signal, and performs data processing in synchronization with a system clock signal (SCLK), and a detection unit for detecting a magnitude of a surplus of the direct current to the source voltage generated by the voltage generation unit. The data processing unit has a clock control unit for determining a frequency of the system clock signal for the data processing based on the magnitude of the surplus detected by the detection unit in a state where a frequency of the system clock signal is set to a predetermined reference frequency.

Item 15 provides the same operational effects on the clock signal frequency optimization as item 14.

2. Details of Embodiments

Embodiments will be described in greater detail below.

First Embodiment

Figure 2:
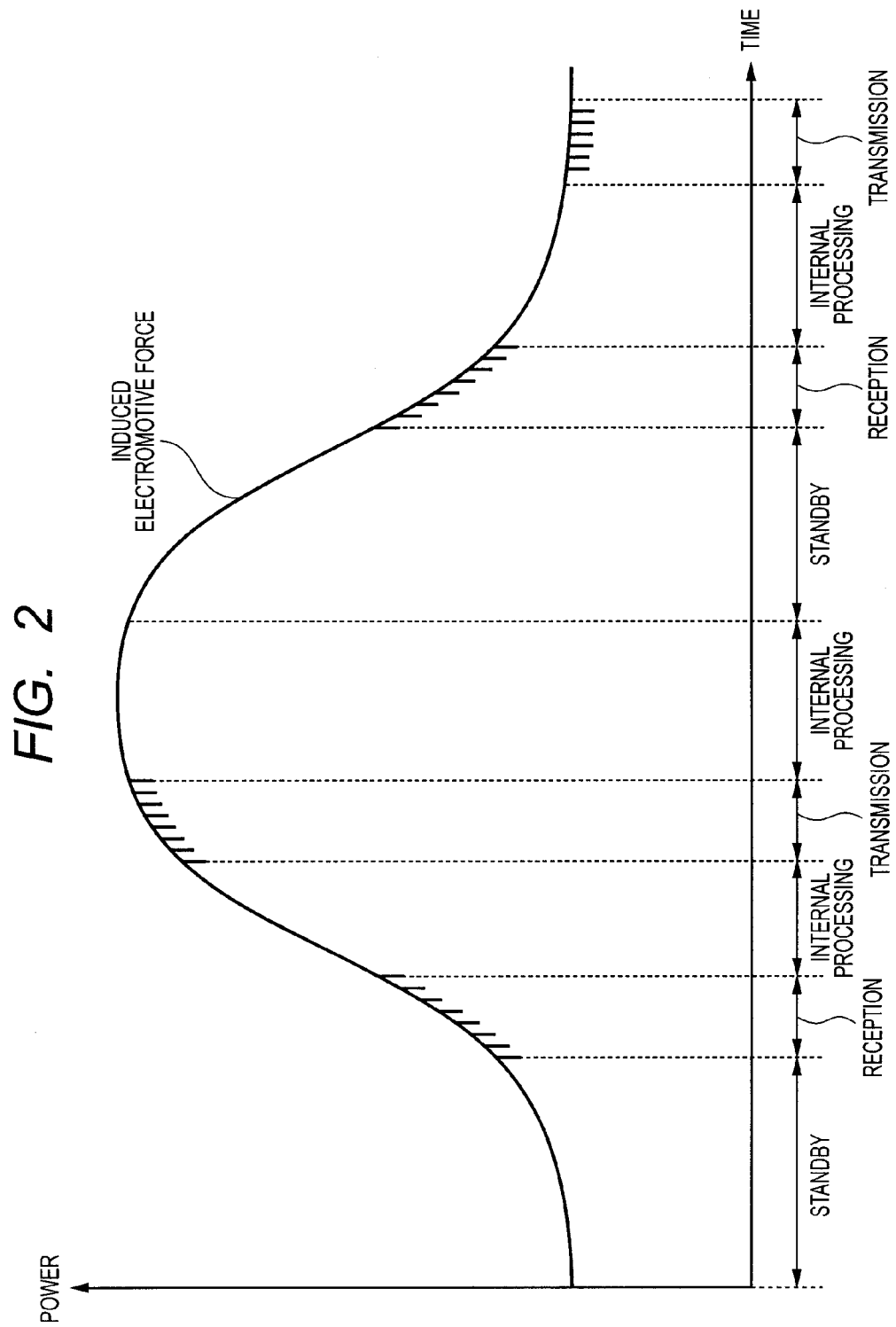
FIG. 2 is an operation explanation diagram illustrating serial processing including reception, transmission, and internal processing performed by the contactless communication device during the occurrence of the operating power of induced electromotive force.

FIG. 1 illustrates a schematic configuration of a contactless communication device 1 according to a first embodiment of the invention. Although not restricted, the contactless communication device 1 shown in FIG. 1 is formed over a single semiconductor substrate made of, e.g., monocrystalline silicon, using a MOS integrated circuit manufacturing technology. The contactless communication device 1 performs RF communication with an external device such as a reader/writer (not shown). As illustrated in FIG. 2, the contactless communication device 1 operates with the power of induced electromotive force obtained by approaching the external device, and performs "reception" of receiving data transmitted from the external device to the contactless communication device 1, "transmission" of transmitting data from the contactless communication device 1 to the external device, and "internal processing" such as data processing of reception data and transmission data, during a period when operable power is supplied. Although not restricted, reception, transmission, and internal processing are performed in series.

In FIG. 1, the contactless communication device 1 has a first antenna coupling terminal LA and a second antenna coupling terminal LB between which an antenna L1 is coupled, a voltage generation unit 20 for generating a predetermined source voltage VDD from a direct current obtained by rectifying a signal inputted from the antenna terminals LA and LB, a transmission/reception unit (RX/TX) 2 which operates at the source voltage VDD generated by the voltage generation unit 20 and performs transmission/reception operations through the antenna terminals LA and LB, a data processing unit 6 which operates at the source voltage VDD generated by the voltage generation unit 20 and performs data processing on a signal received and a signal to be transmitted by the transmission/reception unit 2 in synchronization with a system clock signal SCLK, and a current detection unit (PWR) 5 for detecting the magnitude of a surplus of the direct current to the source voltage VDD generated by the voltage generation unit 20 and supplying it to the data processing unit 6.

The voltage generation unit 20 includes a rectifier circuit (RECT) 3, a voltage regulation unit (REG) 4 as a regulator, and a smoothing capacitor C1. The rectifier circuit 3 rectifies an alternating-current signal received by the antenna L1 provided to the contactless communication device 1, and the smoothing capacitor C1 smoothes the voltage rectified by the rectifier circuit 3 into a direct-current voltage. The voltage regulation unit 4 monitors the direct-current voltage level to regulate the level of the source voltage VDD so that the source voltage does not exceed the withstand voltage of components configuring circuits coupled to the direct-current voltage. The source voltage VDD regulated by the voltage regulation unit 4 and a ground voltage VSS are supplied as operating power to the data processing unit 6, the current detection unit 5, and the transmission/reception unit 2.

The current detection unit 5 determines that a current SIG1 flowing through the voltage regulation unit 4 is equal to or larger than a predetermined current, and outputs a multi-bit detection signal SIG2. The detection signal SIG2 is used for frequency control etc. of the system clock signal SCLK of the data processing unit 6. The data processing unit 6 operates typically in synchronization with the system clock signal SCLK, and has an interface circuit (I/F) 7 for passing data such as reception data and transmission data from and to the transmission/reception unit 2, a central processing unit (CPU) 10 for executing programs, a RAM 9 which is used as e.g. a work area of the CPU 10, a ROM for storing programs which the CPU 10 executes, control data, and the like, a memory unit (MRY) 9 which is configured with flash memory, EEPROM, or the like, a logic unit (LGC) 8 which has other logic functions such as a timer and a DSP, and a clock control unit 11.

The transmission/reception unit 2 includes a reception unit and a transmission unit. The reception unit demodulates an information signal superimposed on an alternating-current signal received by the antenna L1 coupled to the contactless communication device into a digital information signal, which is supplied to the interface circuit 7. The reception unit further has the function of generating a carrier clock signal CLK by extracting a carrier component from a reception signal. On the other hand, the transmission unit receives a digital information signal outputted from the interface circuit 7 and generates an alternating-current signal to be outputted through the antenna L1 to the outside.

Figure 3:
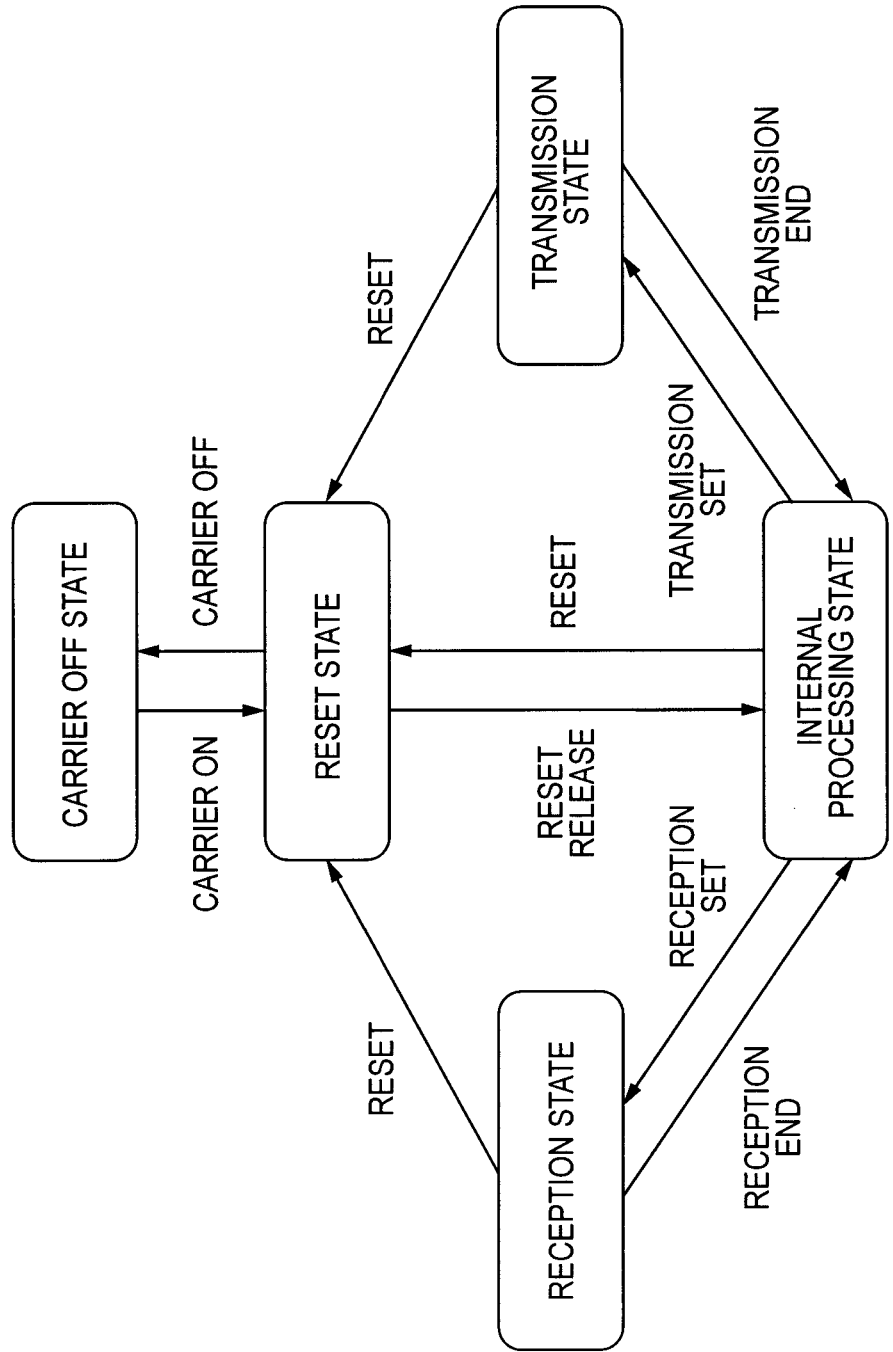
FIG. 3 is a state transition diagram of the contactless communication device.

FIG. 3 is a state transition diagram of the contactless communication device 1. If there is no carrier signal from an external device, the contactless communication device 1 is in a "carrier off state". If a carrier signal is supplied from the antenna L1, the voltage regulation unit 4 supplies the source voltage VDD generated by rectifying and smoothing the carrier signal to the data processing unit 6, the transmission/reception unit 2, and the current detection unit 5. Even if the carrier signal is inputted, if the source voltage VDD is not sufficiently stable, the contactless communication device 1 goes into a "reset state". If the source voltage VDD is sufficiently stable, the resetting of the data processing unit 6 is released, so that the contactless communication device 1 transitions to an "internal processing state". In the internal processing state, the CPU 10 sets an internal state of reception operation of the data processing unit 6, so that the contactless communication device 1 can transition to a "reception state" for receiving data (downstream data) outputted from the external device. In the "reception state", the downstream data outputted from the external device is temporarily stored in the buffer area of the memory unit 9 through the interface circuit 7. After the end of the reception, the contactless communication device 1 transitions to the internal processing state again, and the CPU 10 processes the downstream data stored in the memory unit 9, generates upstream data to be transmitted to the external device, and stores it in the memory unit 9. Then, the CPU 10 sets an internal state of transmission operation of the data processing unit 6, so that the contactless communication device 1 can transition to a "transmission state" and transmit data (upstream data) to the external device. After the end of the transmission, the contactless communication device 1 transitions to the internal processing state again, and the first contactless communication ends. These reception and transmission of downstream data and upstream data are repeated for necessary contactless communication. However, if a contactless communication distance from the external device becomes large, sufficient power is not supplied; accordingly, the contactless communication device 1 transitions to the reset state, no matter which state the internal state is.

Figure 4:
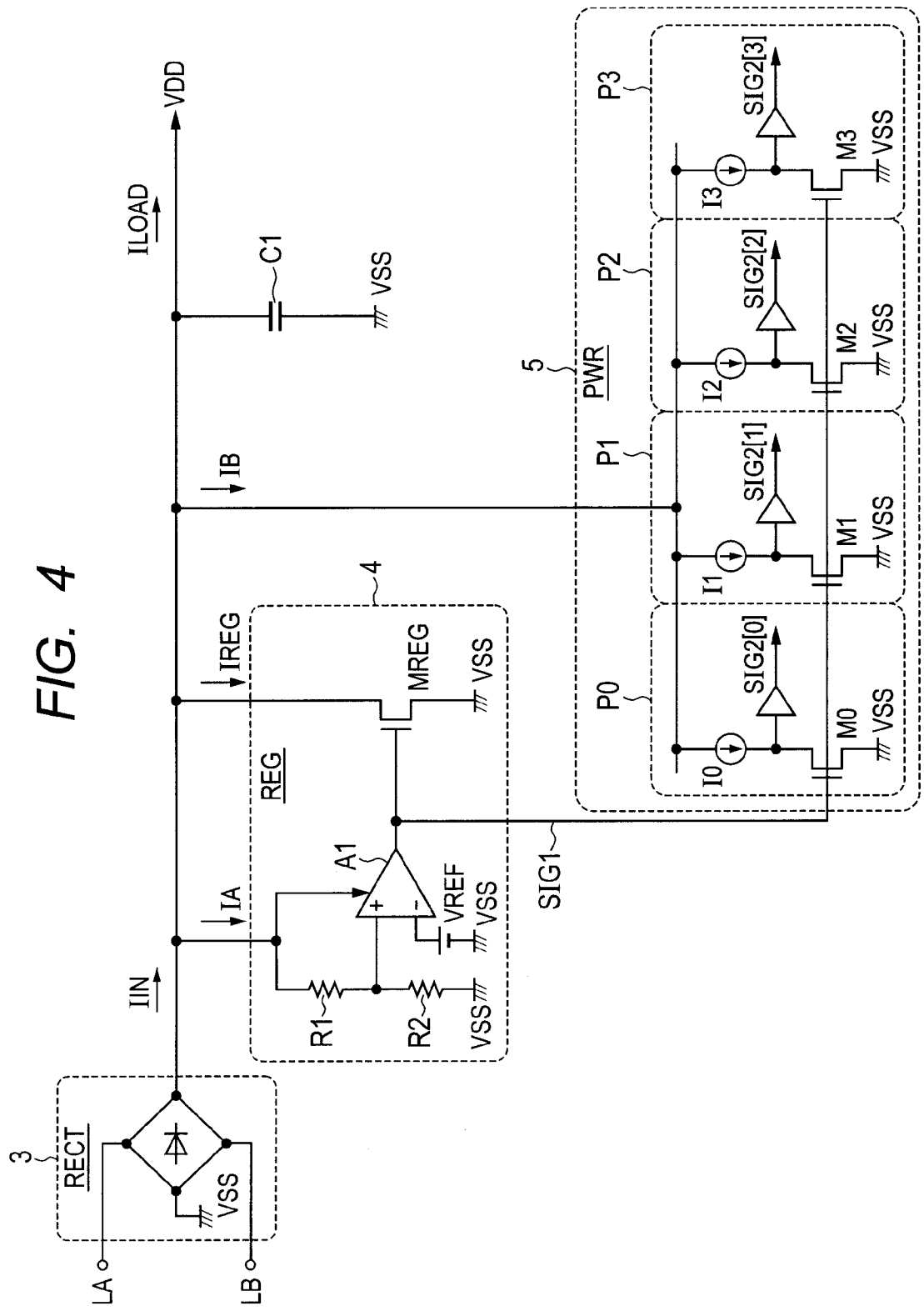
FIG. 4 is a circuit diagram showing a specific example of a voltage regulation unit and a current detection unit.

FIG. 4 shows a specific example of the voltage regulation unit 4 and the current detection unit 5. An alternating-current signal received by the antenna L1 is applied between the antenna terminals LA and LB, and the rectifier circuit 3 rectifies the alternating-current signal and outputs a current IIN. The current IIN charges the smoothing capacitor C1 so that a smoothed direct-current voltage is generated as the source voltage VDD, which supplies an operating current ILOAD to the circuits coupled thereto.

The voltage regulation unit 4 is configured with resistors R1 and R2, a reference voltage source VREF, an operational amplifier A1, and a voltage regulating MOS transistor MREG, and regulates a current flowing through the voltage regulating MOS transistor MREG so that the source voltage VDD does not exceed a predetermined voltage level (VREF× (R1+R2)/R2), thus suppressing an undesired rise in the level of the source voltage VDD. Specifically, when a current (IA+IB+ILOAD) required for the operation of the circuits coupled to the source voltage VDD is smaller than the current IIN supplied from the rectifier circuit 3, the voltage regulation unit 4 performs regulation so as to increase the current IREG flowing through the voltage regulating MOS transistor MREG and therefore operates so as to maintain the source voltage VDD at the predetermined voltage level. As the power supplied between the antenna terminals LA and LB increases, the current IIN outputted from the rectifier circuit 3 increases, so that the current IREG flowing through the MOS transistor MREG increases. Therefore, the current IREG represents a surplus current corresponding to a surplus power. The current IIN supplied from the rectifier circuit 3 is the sum of a consumption current IA of the voltage regulation unit 4, the current IREG flowing through the voltage regulating MOS transistor MREG, a consumption current IB of the current detection unit 5, and a consumption current ILOAD of the circuits to which the source voltage VDD is supplied. The consumption currents IA and IB are steady currents, the current ILOAD is a current that varies according to the operating state of the circuits that operate therewith, and the current IREG is an excess current which is pulled down to the ground voltage VSS to maintain the source voltage VDD at the predetermined level as described above.

Although not restricted, the current detection unit 5 is configured with four current detection unit circuits P0 to P3, and is a circuit for detecting the amount of current flowing through the voltage regulating MOS transistor MREG, using a voltage supplied to the gate terminal of the voltage regulating MOS transistor MREG. Detection signals SIG2[0], SIG2[1], SIG2[2], and SIG2[3] of the detection unit circuits P0 to P3 are 4 bits, and are collectively referred to as a detection signal SIG2.

The current detection unit circuit P0 compares a current flowing through a MOS transistor M0 which receives at a gate terminal the gate voltage of the voltage regulating MOS transistor MREG with a constant current from a reference current source I0 and generates the detection signal SIG2[0]. More specifically, if the current flowing through the MOS transistor M0 is smaller than the reference current I0, SIG2[0]="L" (low level). If the current flowing through the MOS transistor M0 is larger than the reference current I0, SIG2[0]="H" (high level). Reference symbols INV0 to INV3 denote inverters. Since the MOS transistor M0 is current-mirror-coupled to the voltage regulating MOS transistor MREG at the gate terminal, the current detection unit circuit P0 detects the current (surplus current) IREG flowing through the voltage regulating MOS transistor MREG. Specifically, in the case where the size of the MOS transistor M0 is 1/N times the size of the voltage regulating MOS transistor MREG, the current detection unit circuit P0 equivalently compares the current IREG flowing through the voltage regulating MOS transistor MREG with N times the reference current I0. Therefore, if the current IREG is equal to or larger than N times the reference current I0, the detection signal SIG2[0] becomes "H".

The current detection unit circuits P1 to P3 are configured in the same manner as the current detection unit circuit P0. However, by changing the current values of the reference currents I0 to I3 and the sizes of the MOS transistors M0 to M3, it is possible to individually set the detection levels of the detection signals SIG2[0] to SIG2[3]. Further, by fine-tuning the current amounts of the reference current sources I0, I1, I2, and I3, it is possible to optimally adjust the detection amount of the current detection signal. The magnitude of the surplus current is detected by the values of the 4-bit detection signals SIG2[0], SIG2[1], SIG2[2], and SIG2[3].

The clock control unit 11 shown in FIG. 1 includes a clock generator 14, a register (CREG) 13, and a data generation circuit 12. The clock generator 14 receives the carrier clock signal CLK generated by extracting a carrier component from a signal inputted from the antenna terminals LA and LB, generate a plurality of clock signals having different frequencies by frequency-dividing the inputted carrier clock signal CLK, selects a clock signal of a frequency specified by clock selection data, and outputs it as the system clock signal SCLK. For example, in the case where the frequency of the carrier clock signal CLK is 13.56 MHz, the frequencies of the system clock signal SCLK which can be specified by clock selection data are, but not limited to, 565 kHz at minimum and integral multiples of 1.13 MHz, up to 13.56 MHz. The register 13 stores clock selection data supplied to the clock generator 14, an enable bit for the data generation circuit 12, and the like. The CPU 10 or the data generation circuit 12 sets the clock selection data in the register 13. For example, in accordance with program description, the CPU 10 sets the clock selection data in the register. At the time of transition to a low-power consumption state, the CPU 10 executes a store instruction to set clock selection data for setting a predetermined low frequency. In the case where the data generation circuit 12 generates and sets clock selection data, the CPU 10 sets the enable bit, which asserts an enable signal SIG5.

While the enable signal SIG5 is asserted, the data generation circuit 12 refers to the current detection signal SIG2 in synchronization with the assertion timing of a signal SIG4, generates clock selection data corresponding to the referred-to value, and stores the clock selection data in the register 13 using a signal SIG8. Thereby, the system clock signal SCLK is changed to a frequency specified by the signal SIG8. More specifically, clock setting data SIG8A set in the register 13 using the signal SIG8 is provided to the clock generator 14, which changes the frequency of the system clock signal SCLK to the frequency specified by the signal SIG8.

Figure 5:
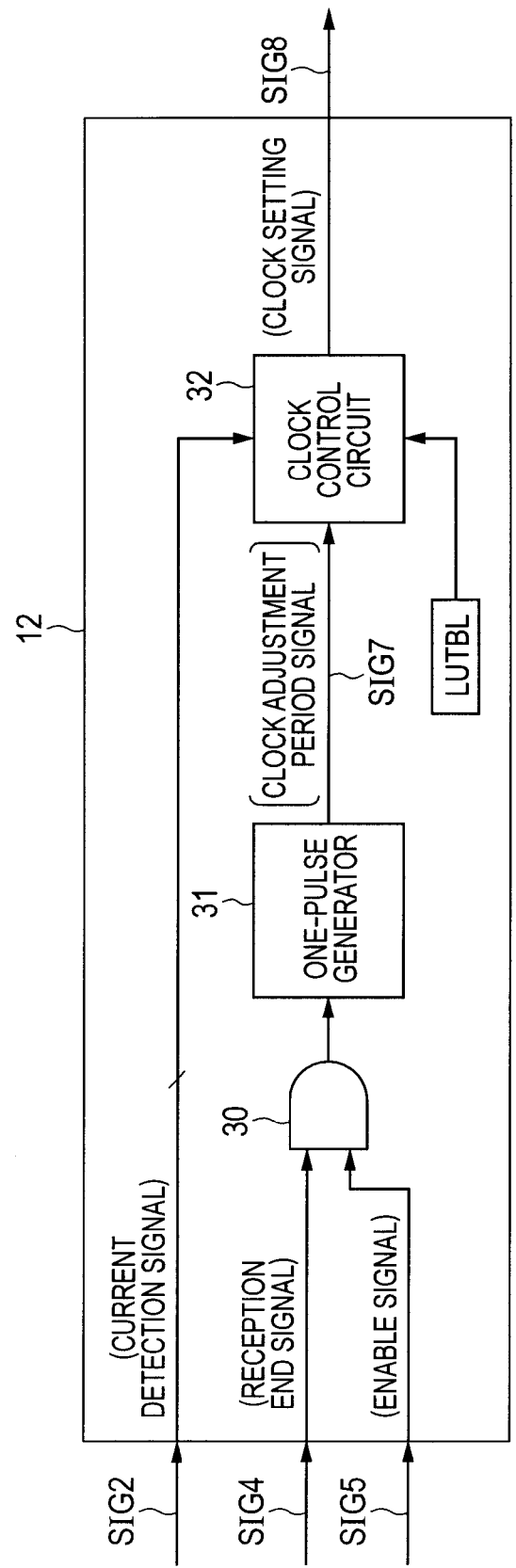
FIG. 5 is a block diagram illustrating the logical configuration of a data generation circuit.

FIG. 5 illustrates the logical configuration of the data generation circuit 12. In response to the AND signal of a reception end signal SIG4 and the enable signal SIG5 through an AND gate, a one-pulse generator 31 generates a pulse as a clock adjustment period signal SIG7. A clock control circuit 32 which receives the pulse SIG7 refers to the current detection signal SIG2 and outputs the clock setting signal SIG8 using a look-up table LUTBL or the like, during the pulse period of the signal SIG7.

The signal SIG4 is a signal with which the interface circuit 7 notifies a reception end when end notification data of transmission processing or reception processing shown in FIG. 2 is notified with a signal SIG3 from the transmission/reception unit 2 to the interface circuit 7. In the case where the data processing unit 6 is set to be in a low-power consumption state (sleep state) with minimum functions during a transmission operation or a reception operation; after the end of transmission processing or reception processing, the data processing unit 6 needs to release the low-power consumption state and perform data processing on reception data or transmission data. The signal SIG4 is asserted for release of the low-power consumption state. In response thereto, the data generation circuit 12 sets data for changing the frequency of the system clock signal SCLK in the register 13. After the end of the data setting, an interrupt request causes the CPU 10 to start data processing, and the data processing unit 6 returns to a data processing operating state from the low-power consumption state. At the time of return (transition) to the data processing state from the low-power consumption state, the CPU 10 accesses the interface circuit 7 to negate the signal SIG4. When the data generation circuit 12 refers to the current detection signal SIG2 and generates new clock selection data, the frequency of the system clock signal SCLK is uniformly set to a predetermined low frequency (predetermined reference frequency), e.g. 1.13 MHz, to be selected in the low-power consumption state. Therefore, power consumed by the data processing unit at the time of referring to the current detection signal SIG2 is determined by the reference frequency, and the surplus of the direct current can be detected as an absolute surplus by the current detection signal SIG2. Thereby, the data generation circuit 12 has the look-up table LUTBL which stores the decoded value of the current detection signal SIG2 and the clock selection data of the corresponding frequency beforehand, and can uniquely determine the clock selection data in accordance therewith. Unlike detecting a relative surplus without specifying a clock frequency at the time of detection, it is not necessary to gradually change the frequency while repeating the detection of the surplus current, and it is possible to determine the clock signal frequency of the data processing unit 6 in a short time without a waste with precision. Due to the short-time determination, it is possible to reduce the data processing time (transaction time) of the data processing unit 6 in the contactless communication device 1 which performs contactless communication with outside. Further, since the current detection unit 5 detects the magnitude based on the surplus signal SIG1 of the direct current generated in the voltage generation unit 20, it is not necessary to add a large circuit for the detection.

Hereinafter, the operation of changing the frequency of the system clock signal SCLK at the time of release of the low-power consumption state will be described in greater detail.

Figure 6:
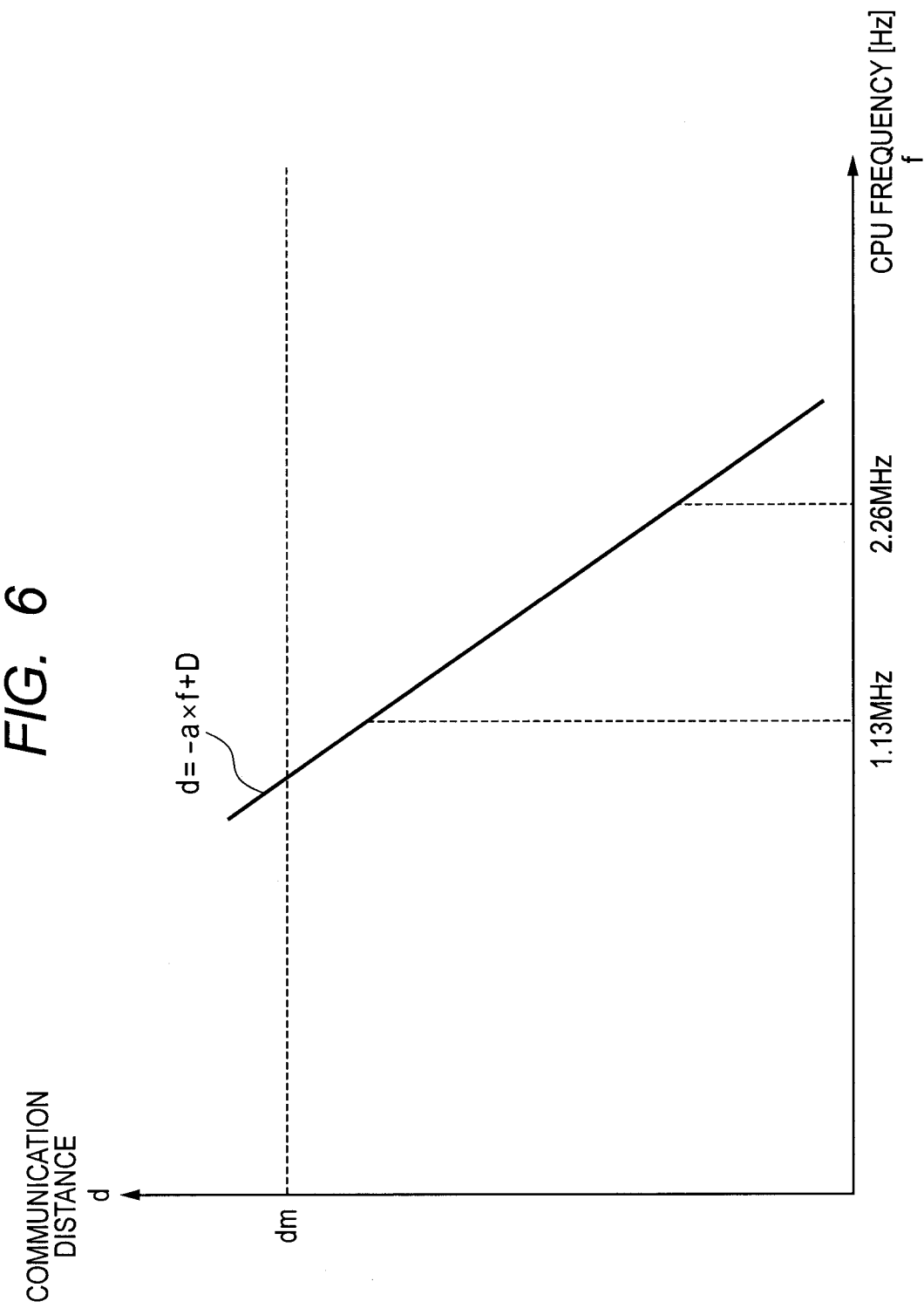
FIG. 6 is an explanation diagram for explaining the principle of processing for optimizing a frequency in accordance with the detection value of a surplus current by the current detection unit.

In the contactless communication device 1, in order not to cause the data processing unit 6 to malfunction due to noise during the reception operation, the data processing unit 6 is set to be in a standby state as the low-power consumption state. For example, the system clock signal SCLK is set to the minimum frequency (e.g., 1.13 MHz) required for resumption of data processing in response to a reception operation end notification, and a path for supplying the operating source voltage VDD to all or part of the logic unit 8 that is not required to operate in the standby state is shut off. For the setting to the standby state, for example the CPU 10 executes a standby instruction to set clock selection data for selecting a frequency of 1.13 MHz in the register 13 and perform partial power shutdown control. This makes it possible to suppress the consumption current of the contactless communication device 1 and keep the consumption current ILOAD constant during the reception operation. Specifically, if transmission power from the external device is constant, since the current detection unit 5 detects the current at the constant frequency (1.13 MHz) of the system clock signal SCLK in the standby state, the current detection value can be regarded as a current value corresponding to a margin distance to a maximum communication distance dm, as illustrated in FIG. 6. If D denotes a communication distance in the case where the clock frequency of the contactless communication device is zero, "a" denotes a per-hertz consumption current of the contactless communication device, and "f" denotes the frequency of the system clock signal SCLK, a distance "d" up to which the contactless communication device can perform contactless communication can be expressed as: "d=−a×f+D". Since there is a correlation between the communication distance and the magnitude of the surplus current, it is possible to determine the frequency "f" in accordance with the detection value by the current detection unit 5 corresponding to D-d in a clock frequency adjustment operation (clock adjustment period). For example, assume that the frequency of the system clock signal SCLK is set to 6.78 MHz, though not restricted. Since f=6.78 MHz and "a"=constant, the value of D-d is uniquely determined. That is, the frequency "f" can be determined by the current value of the current detection unit 5 corresponding to the value larger than D-d. The principled relationship is illustrated in FIG. 6. With this principle relationship, by latching the current detection signal SIG2 immediately after the end of the reception operation and setting the frequency of the system clock signal SCLK corresponding to the current detection signal, the contactless communication device 1 can detect the surplus current without being affected by the CPU frequency and optimize the frequency of the system clock signal SCLK. As described above, an operation mode (an internal processing state frequency adjustment mode, a frequency adjustment mode, a frequency optimization mode, an automatic clock adjustment function) for determining the clock signal frequency in the normal data processing state is determined by the signal SIG5 reflecting the setting state of the register 13. The operation mode is selected if SIG5="H", and the operation mode is not selected if SIG5="L".

Figure 7:
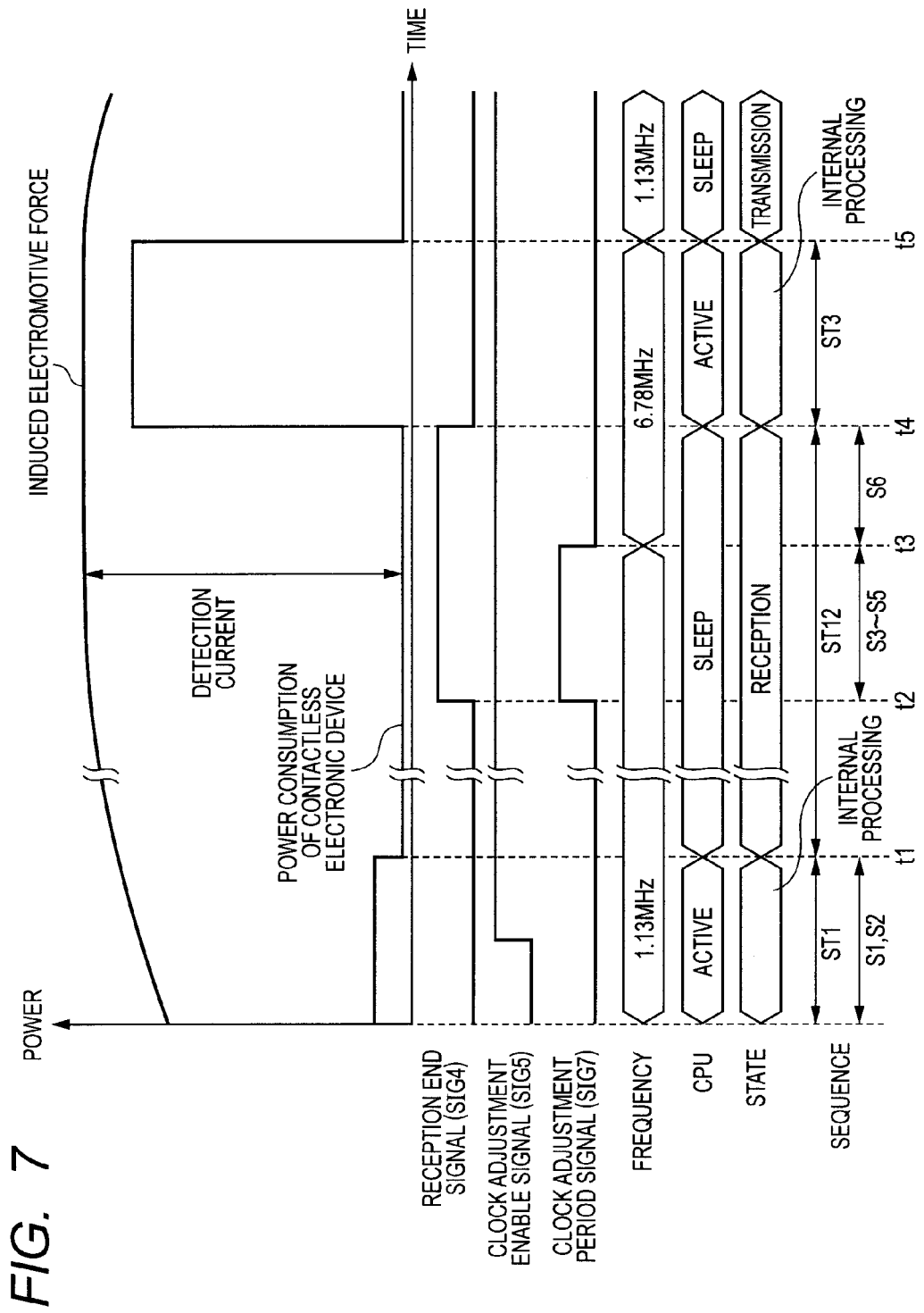
FIG. 7 is a timing chart illustrating operation timing of optimization processing of a clock signal frequency.
Figure 8:
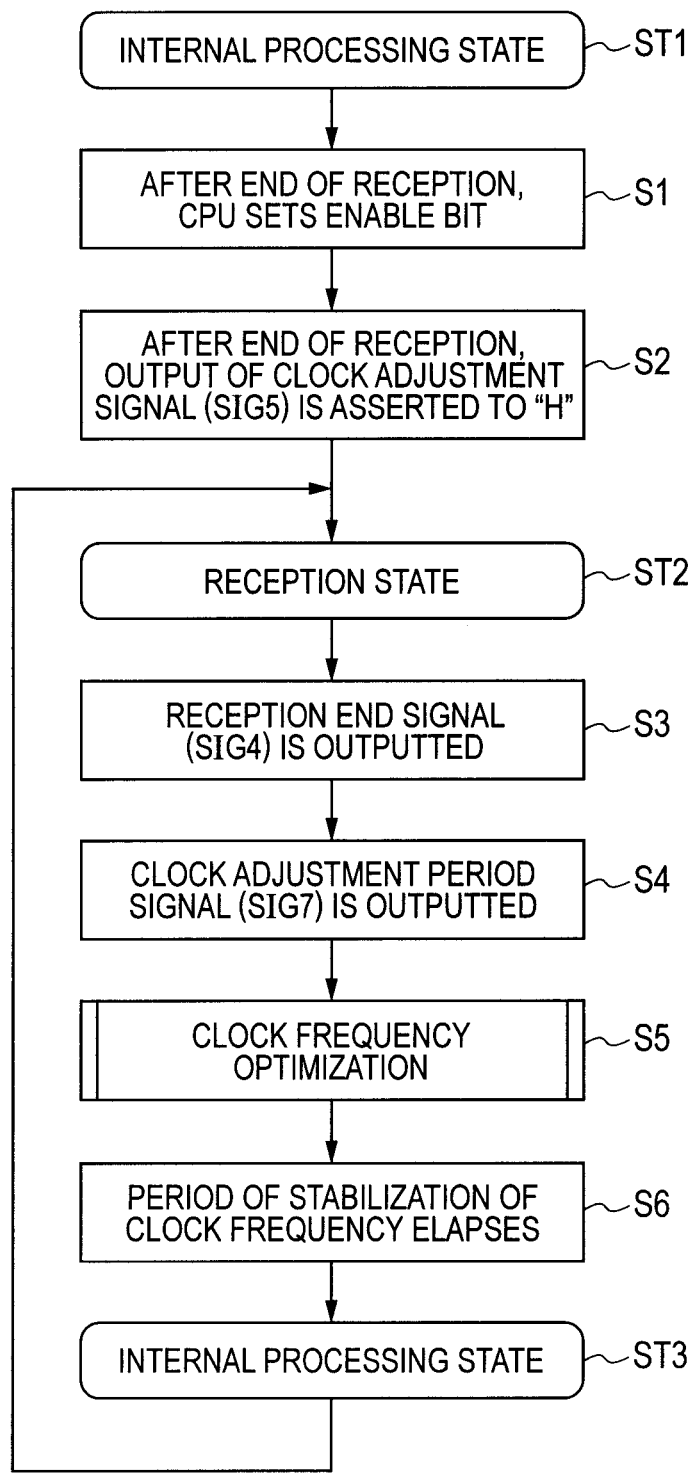
FIG. 8 is a flowchart illustrating the sequence of optimization processing of the clock signal frequency in FIG. 7.
Figure 9:
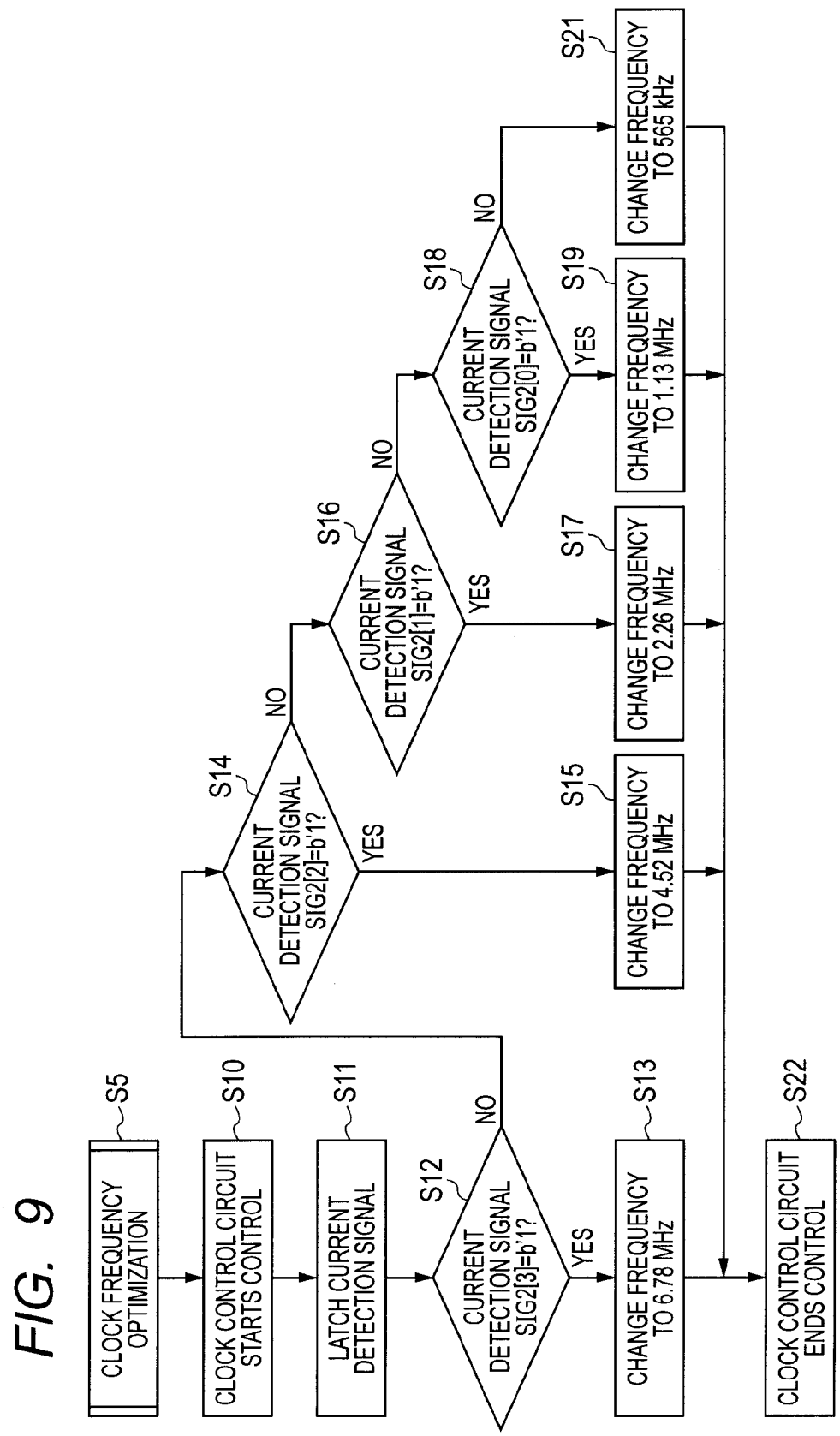
FIG. 9 is a flowchart illustrating a control flow dedicated to selection control of the clock frequency in FIG. 8.

FIG. 7 illustrates operation timing of optimization processing of the clock signal frequency. FIG. 8 illustrates a sequence flowchart of optimization processing of the clock signal frequency. FIG. 9 illustrates a control flowchart dedicated to selection control of the clock-frequency.

In FIG. 7, "SLEEP" denotes the low-power consumption state, and "ACTIVE" denotes a normal operation state of the data processing unit 6. In consideration of changes and drops in induced electromotive force during transmission and reception, the frequency of the system clock signal SCLK of the data processing unit 6 in the low-power consumption state is set to 1.13 MHz, though not restricted. When the end of a reception operation, i.e., the high level of the reception end signal SIG4 is provided to the data generation circuit 12 (time t2) and the enable signal SIG5 is "H", the one-pulse generator 31 operates to change the pulse of the clock adjustment period signal SIG7 for a clock frequency adjustment operation (time t2 to time t3). The "H" period of the clock adjustment period signal SIG7 is a clock adjustment period. Thereby, in FIG. 7, the frequency is changed to 6.78 MHz, the low-power consumption state is released (time t4), and internal processing of reception data is started by the data processing unit 6. That is, upon the end of the reception operation, the optimization of the clock signal is performed in the low-power consumption state maintained, and then the low-power consumption state is released. If the clock adjustment signal SIG5 is "L" after the end of the reception, the clock adjustment period signal SIG7 remains negated. The one-pulse generator 31 does not operate. In FIG. 7, ST1 denotes the internal processing state, ST2 denotes the reception state, and ST3 denotes the internal processing state, and the correspondences between these states and steps S1 to S6 in FIG. 8 are illustrated.

In FIG. 8, when the resetting of the data processing unit 6 is released, the device 1 transitions to the internal processing state (ST1). In the internal processing state ST1, as processing related to the clock optimization processing, the CPU 10 performs processing (S1) for writing a value for permitting a clock adjustment function after the end of reception to the enable bit in the register 13, so that the output of the clock adjustment enable signal SIG5 is asserted to "H" (S2).

Then, the device 1 transitions from the internal processing state ST1 to the reception state ST2. As processing related to the clock optimization processing, after the end of reception of the reception data, the reception end signal SIG4 is outputted (S3), so that the one-pulse generator 31 operates to output the clock adjustment period signal SIG7 (S4). Then, the clock control circuit 32 starts clock frequency optimization processing (S5). Further, there elapses a period of stabilization of the system clock signal SCLK with the clock frequency changed by the clock frequency optimization processing by the clock control circuit 32 (S6). After the stabilization, the low-power consumption state is released, and the device 1 transitions from the reception state ST2 to the internal processing state ST3.

The clock frequency optimization processing S5 illustrated in FIG. 9 is performed in the "H" period of the clock adjustment period signal SIG7. In FIG. 9, although not restricted, the current detection signal SIG2 is comprised of 4 bits, and out of five frequencies, one frequency is selected for clock frequency optimization.

When the clock adjustment period signal SIG7 becomes "H", the clock control circuit 32 starts to operate (S10). First, the clock control circuit 32 latches the current detection signal SIG2 (SIG2[3] to SIG2[0]) from the current detection unit 5 (S11). Then, the clock control circuit 32 decodes the latched signal to determine which bit is "H" (S12, S14, S16, S18). Based on the decoded value, the clock control circuit 32 selects an optimal frequency, and outputs the clock setting signal SIG8 to set the clock (S13, S15, S17, S19, S21). For example, if bit 3 (SIG2[3]) of the current detection signal is "H", the frequency of the system clock signal SCLK is set to 6.78 MHz. If bit 2 (SIG2[2]) of the current detection signal is "H", the frequency of the system clock signal SCLK is set to 4.52 MHz. If bit 1 (SIG2[1]) of the current detection signal is "H", the frequency of the system clock signal SCLK is set to 2.26 MHz. If bit 0 (SIG2[0]) of the current detection signal is "H", the frequency of the system clock signal SCLK is set to 1.13 MHz. If all the bits of the current detection signal are "L", the frequency of the system clock signal SCLK is set to 565 kHz. That is, the frequency of the system clock signal SCLK is set to a higher or lower one in accordance with the state of the current detection signal SIG2. Then, the operation of the clock control circuit ends (S22).

In the clock frequency optimization processing S5, these operations make it possible to set the operation clock frequency of the CPU 10 to a required frequency after the release of the low-power consumption state, with the operation clock frequency of the CPU 10 maintained at the predetermined clock frequency in the low-power consumption state.

After the end of the setting operation of the clock frequency, for example the data interface circuit 7 makes an interrupt request to the CPU 10 after the lapse of the period of stabilization of the clock frequency, so that the device 1 transitions from the low-power consumption state to the operable state.

Figure 10:
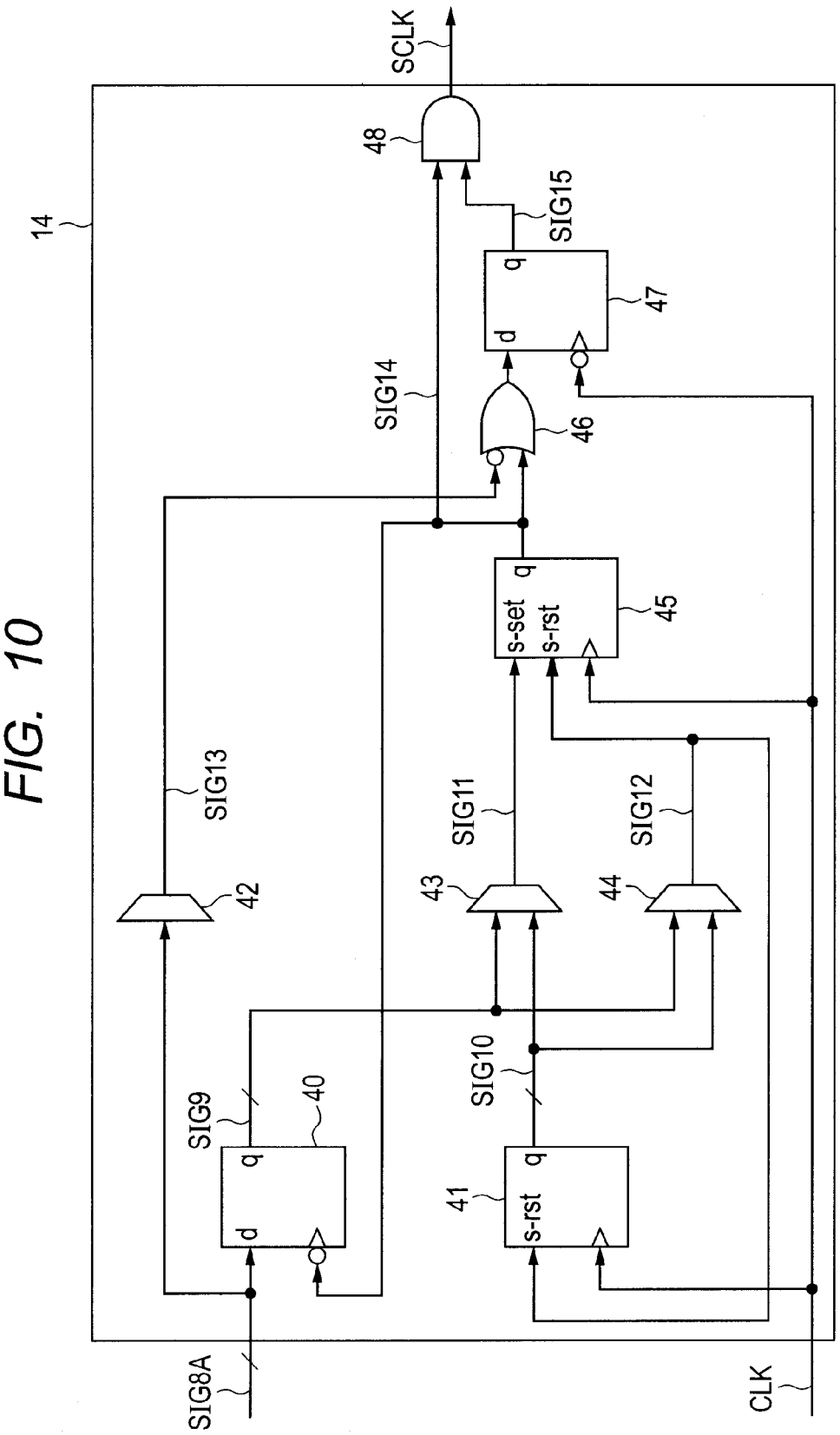
FIG. 10 is a block diagram illustrating the basic configuration of a clock generator.

FIG. 10 illustrates the basic configuration of the clock generator 14. The clock generator 14 shown in FIG. 10 is a mechanism that can freely set the frequency of the system clock SCLK without outputting a hazard at any timing.

The clock setting data SIG8A and the carrier clock signal CLK are supplied to the clock generator 14. The clock setting data SIG8A is set in the register by the data generation circuit 12 using the signal SIG8 or set in the register 13 by the CPU 10. In the configuration example of FIG. 10, a frequency dividing ratio of 2 is specified if the clock setting data SIG8A=H'0, a frequency dividing ratio of 3 is specified if the clock setting data SIG8A=H'1, and a frequency dividing ratio of 4 is specified if the clock setting data SIG8A=H'2.

Reference numeral 40 denotes a delay circuit for the data SIG8A, and the delay of delayed data SIG9 is one cycle of the carrier clock signal CLK. A counter 41 counts the carrier clock signal CLK. The counter 41 is zero-cleared in the next cycle of a count value H'1 if the data SIG9=H'0 (dividing ratio of 2), zero-cleared in the next cycle of a count value H'2 if the data SIG9=H'1 (dividing ratio of 3), and zero-cleared in the next cycle of a count value H'3 if the data SIG9=H'2 (dividing ratio of 4). A set decoder 43 and a reset decoder 44 control the pulse waveforms of output signals SIG11 and SIG12 in accordance with the decode result of the supplied delayed data SIG9 and the value of an input count signal SIG10. The signal SIG11 is at the high level during the period when the count value SIG10=H'0 if the data SIG9=H'0 (dividing ratio of 2) or the data SIG9=H'1 (dividing ratio of 3), and is at the high level during the period when the count value SIG10=H'1 if the data SIG9=H'2 (dividing ratio of 4). A flip-flop 45 generates a signal SIG14 which rises in synchronization with the falling edge of the signal SIG11 and falls in synchronization with the falling edge of the signal SIG12. A decoder 42 outputs the low level if the data SIG9 is an even number (dividing ratio of an even number), and outputs the high level if the data SIG9 is an odd number (dividing ratio of an odd number). In the case of the dividing ratio of an even number, the output of an OR gate 46 is fixed to the high level, so that an AND gate 48 outputs the pulse waveform of the signal SIG14 as the system clock signal SCLK. In the case of the dividing ratio of an odd number, a delay circuit 47 generates a delayed signal SIG15 by delaying the signal SIG14 by a half cycle of the carrier clock signal CLK, and the AND gate 48 outputs the AND signal of the signals SIG14 and SIG15 as the pulse waveform of the system clock signal SCLK.

Figure 11:
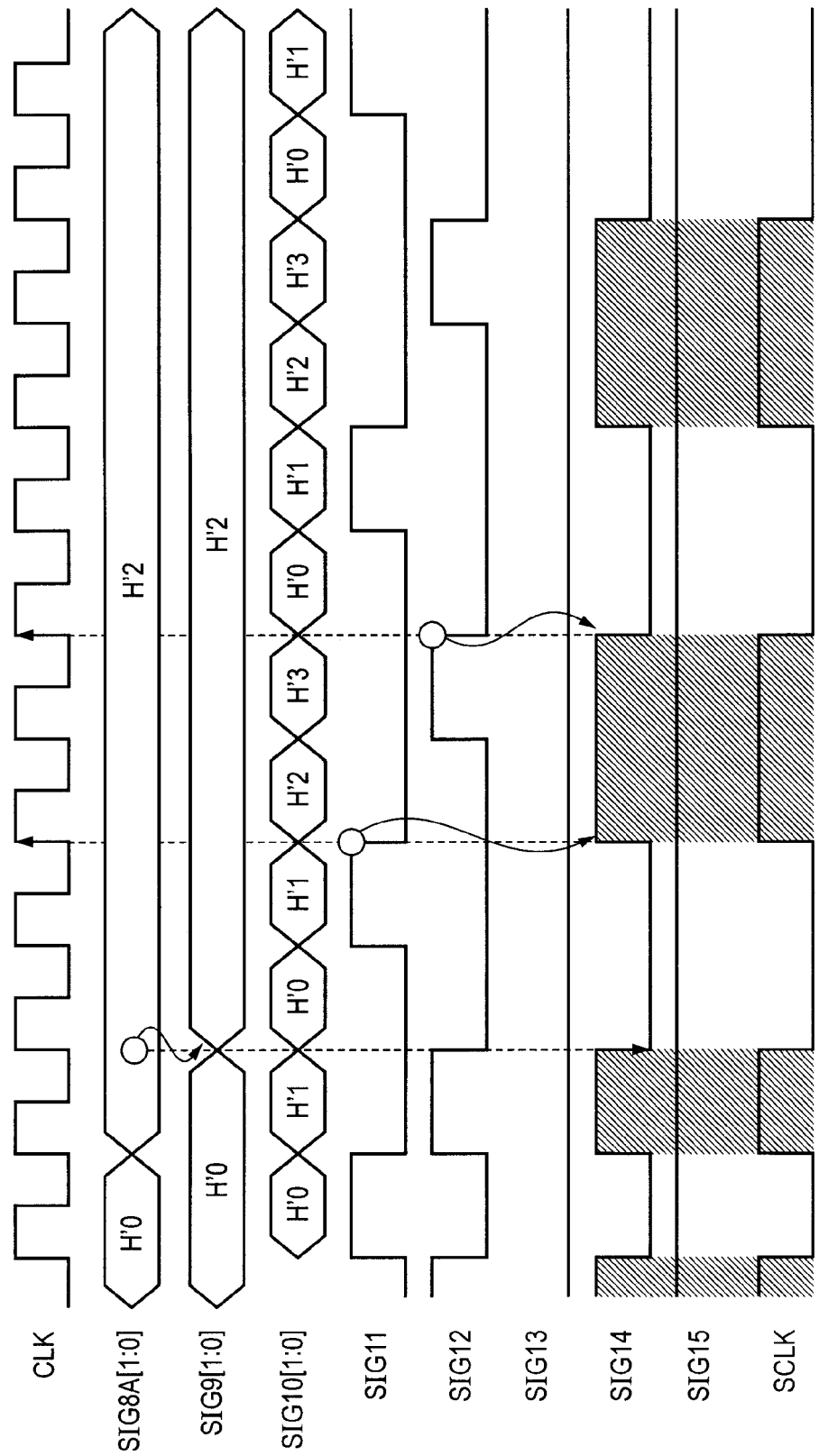
FIG. 11 is a timing chart illustrating operation timing of the clock generator in the case of changing an inputted carrier clock from the dividing ratio of 2 to the dividing ratio of 4.

FIG. 11 illustrates operation timing of the clock generator 14 in the case of changing the inputted carrier clock CLK from the dividing ratio of 2 to the dividing ratio of 4. When the setting data SIG8A is inputted, the clock generator 14 delays the input data by one clock of CLK and latches the delayed data, thus generating the delayed data SIG9. At this timing, the counter 41 restarts a count operation, and the count value is reset to the initial value H'0. The count values reset by the counter 41 differ according to the value of the delayed data SIG9. In the case of the dividing ratio of 4, the set signal SIG11 is "H" when the count signal SIG10 is H'1, and the reset signal SIG12 is "H" when the count value SIG10 is H'3. In the case of the dividing ratio of 4, a dividing-ratio-of-odd-number detection signal SIG13 keeps "L" due to the dividing ratio of the even number. Thereby, a dividing-ratio-of-odd-number clock signal SIG15 also keeps "L". Further, in accordance with the set signal SIG11 and the reset signal SIG12, a dividing-ratio-of-even-number clock signal SIG14 is outputted from the flip-flop 45 as a sync-set sync-reset FF. In the final stage, the dividing-ratio-of-even-number clock signal SIG14 and the dividing-ratio-of-odd-number clock signal SIG15 are ANDed, so that the system clock signal SCLK generated by frequency-dividing the carrier clock CLK by 4 can be outputted seamlessly without causing a hazard.

Figure 12:
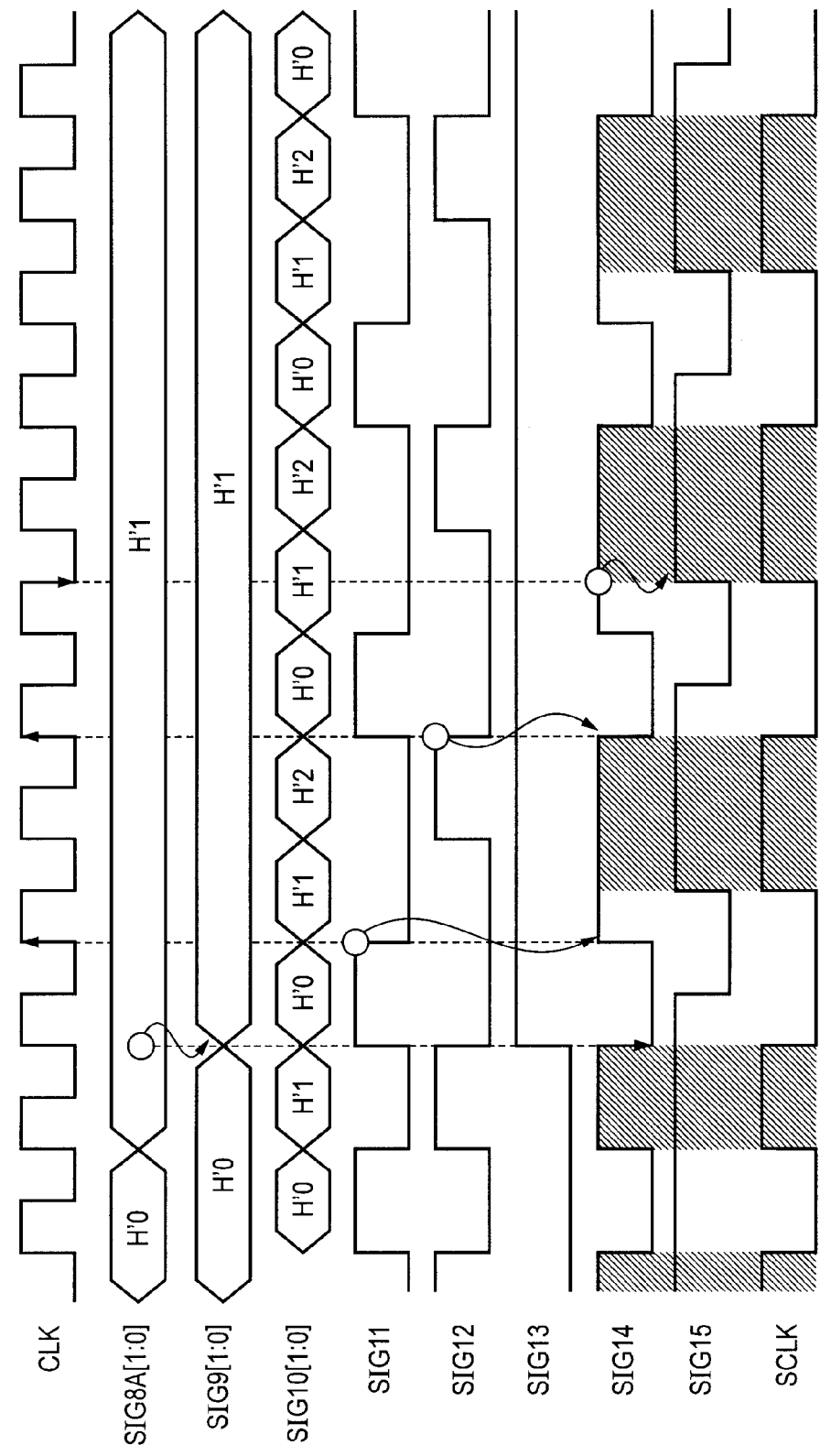
FIG. 12 is a timing chart illustrating operation timing of the clock generator in the case of changing the inputted carrier clock from the dividing ratio of 2 to the dividing ratio of 3.

FIG. 12 illustrates operation timing of the clock generator 14 in the case of changing the inputted carrier clock CLK from the dividing ratio of 2 to the dividing ratio of 3. When the clock setting data SIG8A is inputted, the clock generator 14 delays the input data by one cycle of the carrier clock signal CLK and latches the delayed data, thus generating the delayed data SIG9. At this timing, the count value of the counter 41 is cleared to the initial value. In the case of the dividing ratio of 3, the set signal SIG11 is "H" when the count value SIG10 is H'0, and the reset signal SIG12 is "H" when the count value SIG10 is H'2. In the case of the dividing ratio of 3, the dividing-ratio-of-odd-number detection signal SIG13 is asserted to "H" due to the dividing ratio of the odd number. Further, with the set signal SIG11 and the reset signal SIG12, the dividing-ratio-of-even-number clock signal SIG14 is outputted from the flip-flop 45 as a sync-set sync-reset FF. The delay circuit 47 latches the dividing-ratio-of-even-number clock signal SIG14 on the falling edge of the carrier clock CLK, and outputs the dividing-ratio-of-odd-number clock signal SIG15. In the final stage, the dividing-ratio-of-even-number clock signal SIG14 and the dividing-ratio-of-odd-number clock signal SIG15 are ANDed, so that the system clock SCLK generated by frequency-dividing the carrier clock CLK by 3 can be outputted seamlessly without causing a hazard.

According to the first embodiment described above, when the current detection unit 5 detects the surplus of the direct current generated in the voltage generation unit 20, the frequency of the system clock signal SCLK of the data processing unit 6 is set to the predetermined low frequency (reference frequency), e.g. 1.13 MHz, in the low-power consumption state; therefore, the power consumed by the data processing unit 6 at the time of detecting the surplus of the direct current is determined by the reference frequency, and the surplus of the direct current can be detected as an absolute surplus. Therefore, it is not necessary to gradually change the frequency while repeating the detection of the surplus current, and it is possible to determine the frequency of the system clock signal SCLK of the data processing unit 6 in a short time without a waste with precision. Further, it is possible to exit from the low-power consumption state to the normal operation state by increasing the frequency of the system clock signal SCLK in accordance with the magnitude of the surplus of the direct current detected in response to an instruction for releasing the low-power consumption state by the signal SIG4 from the interface circuit 7. Accordingly, it is possible to optimize the system clock signal frequency of the data processing unit 6 as part of processing for releasing the low-power consumption state, thus performing the optimization of the frequency of the system clock signal SCLK for the received power at the start of data processing performed by the data processing unit 6 in intervals between transmission/reception operations performed by the transmission/reception unit 2. Thereby, it is possible to reduce an internal data processing time (transaction time) in the contactless communication device 1 which performs contactless communication with outside. Further, since the current detection unit 5 detects the magnitude based on the surplus of the direct current generated in the voltage generation unit 20, it is not necessary to add a large circuit for the detection.

Second Embodiment

Figure 13:
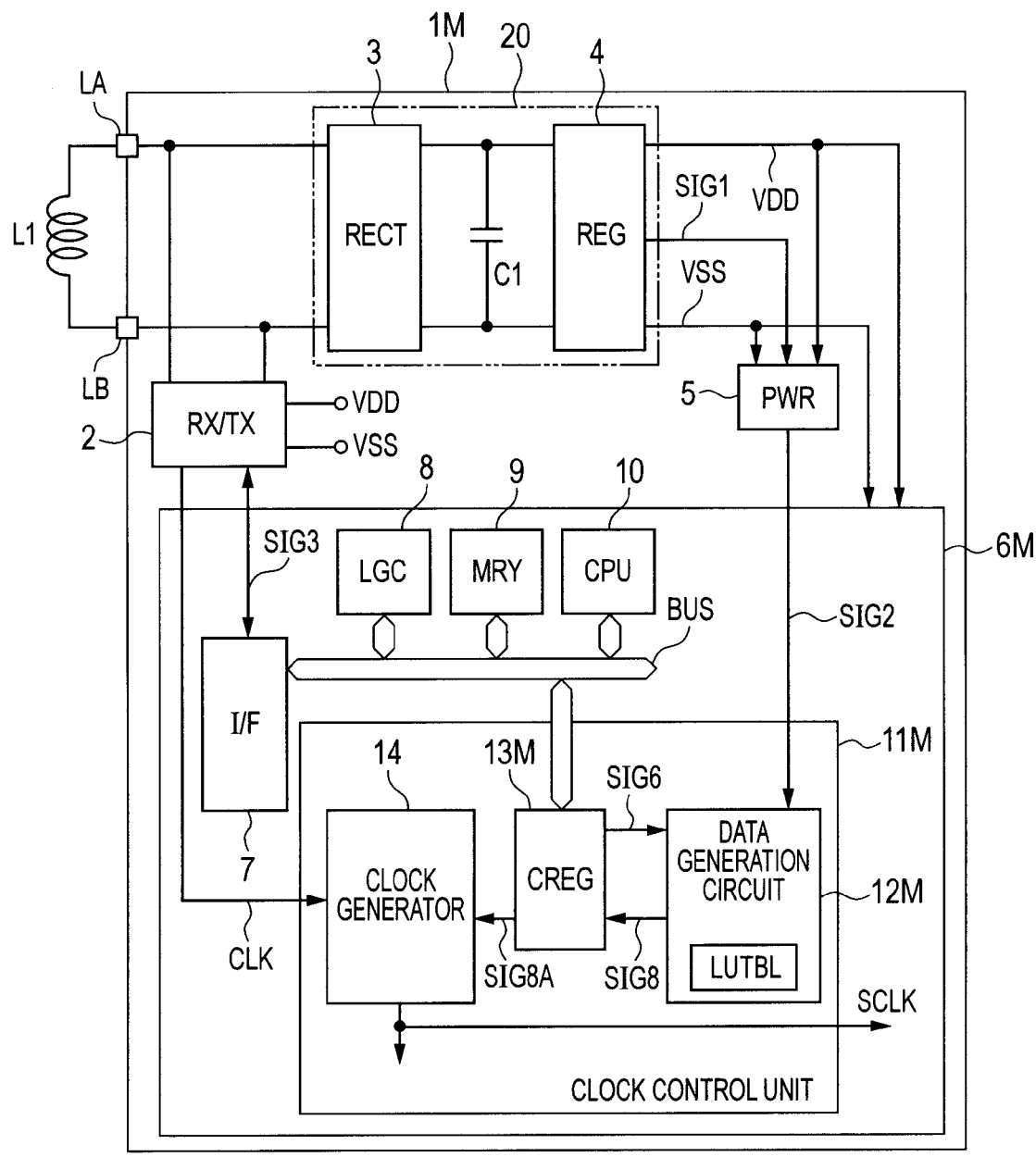
FIG. 13 is a block diagram illustrating a schematic configuration of a contactless communication device according to a second embodiment of the invention.

FIG. 13 illustrates a schematic configuration of a contactless communication device 1M according to a second embodiment of the invention. Although not restricted, the contactless communication device 1M shown in FIG. 13 is formed over a single semiconductor substrate made of, e.g., monocrystalline silicon, using a MOS integrated circuit manufacturing technology. The contactless communication device 1M performs RF communication with an external device such as a reader/writer (not shown), and differs from the contactless communication device 1 of FIG. 1 in the configuration for clock frequency optimization. The same configurations as those of the contactless communication device 1 shown in FIG. 1 will not be described in detail, and the differences will be detailed below.

In the configuration for clock frequency optimization in the contactless communication device 1 according to the first embodiment, in the case of long internal processing, the changing of the frequency of the CPU after the end of reception is not considered. In the second embodiment, it is possible to optimize the frequency of the system clock signal SCLK at required timing during the internal processing, based on an instruction from the CPU 10. At this time, the frequency of the system clock signal SCLK is set to a predetermined low frequency (reference frequency), e.g. 565 kHz, and in this state, the current detection signal SIG2 is latched. Based thereon, a clock control unit 11M can set the frequency of the system clock signal SCLK.

According to an instruction for clock frequency optimization processing, although not restricted, a data generation circuit 12M repeats optimization processing of the clock frequency at predetermined timing in accordance with the logical configuration after an enable signal SIG6 is asserted when the CPU 10 sets the enable bit in the register until the enable signal SIG6 is negated.

Figure 14:
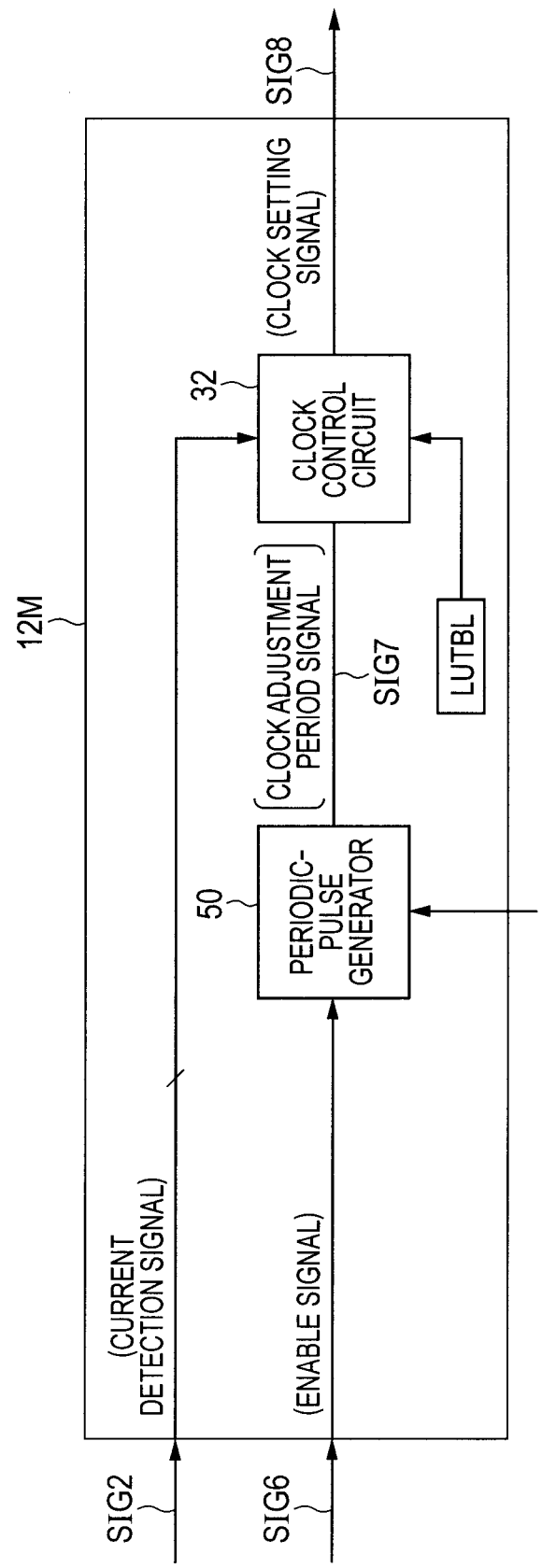
FIG. 14 is a block diagram illustrating the details of a data generation circuit according to the second embodiment.

FIG. 14 illustrates the details of a data generation circuit 12M. Although not restricted, a periodic-pulse generator 50 has a timer function to which a time-out interval is set by the CPU 10. In synchronization with the assertion of the enable signal SIG6, the generator 50 starts a timer operation and generates the clock adjustment period signal SIG7 having a predetermined pulse period every time-out. The clock control circuit 32 which receives the signal SIG7 refers to the current detection signal SIG2 and outputs the clock setting signal SIG8 using the look-up table LUTBL or the like, during the pulse period of the signal SIG7. The clock setting data SIG8A in the register is rewritten by the clock setting signal SIG8, thereby switching the clock frequency of the system clock signal SCLK. Although not restricted, when the enable signal SIG6 is asserted, the periodic-pulse generator 50 first generates the clock adjustment period signal SIG7 for optimization processing of the clock frequency of the system clock signal SCLK.

Figure 15:
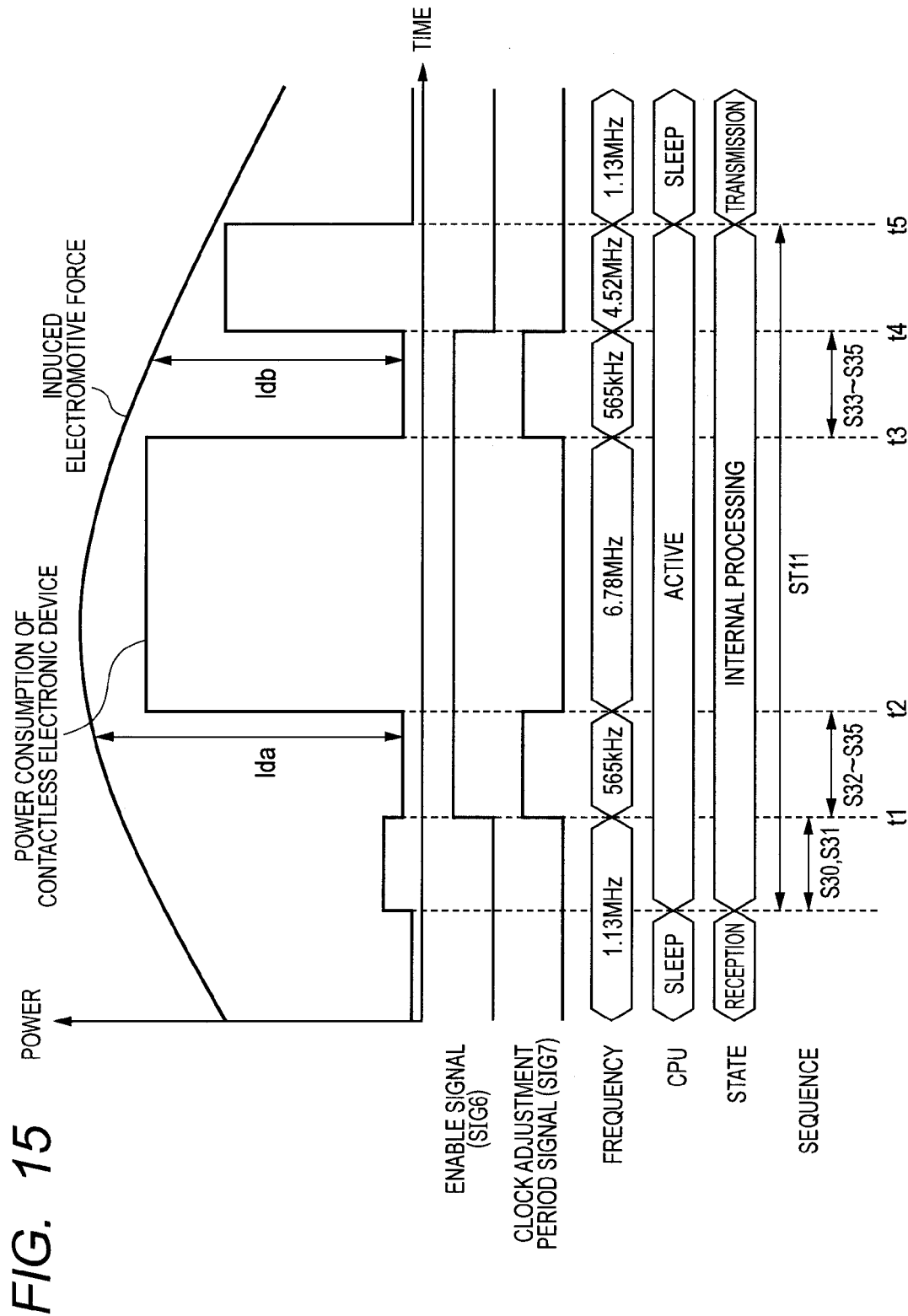
FIG. 15 is a timing chart showing the operation of optimization processing of the clock signal frequency according to the second embodiment.
Figure 16:
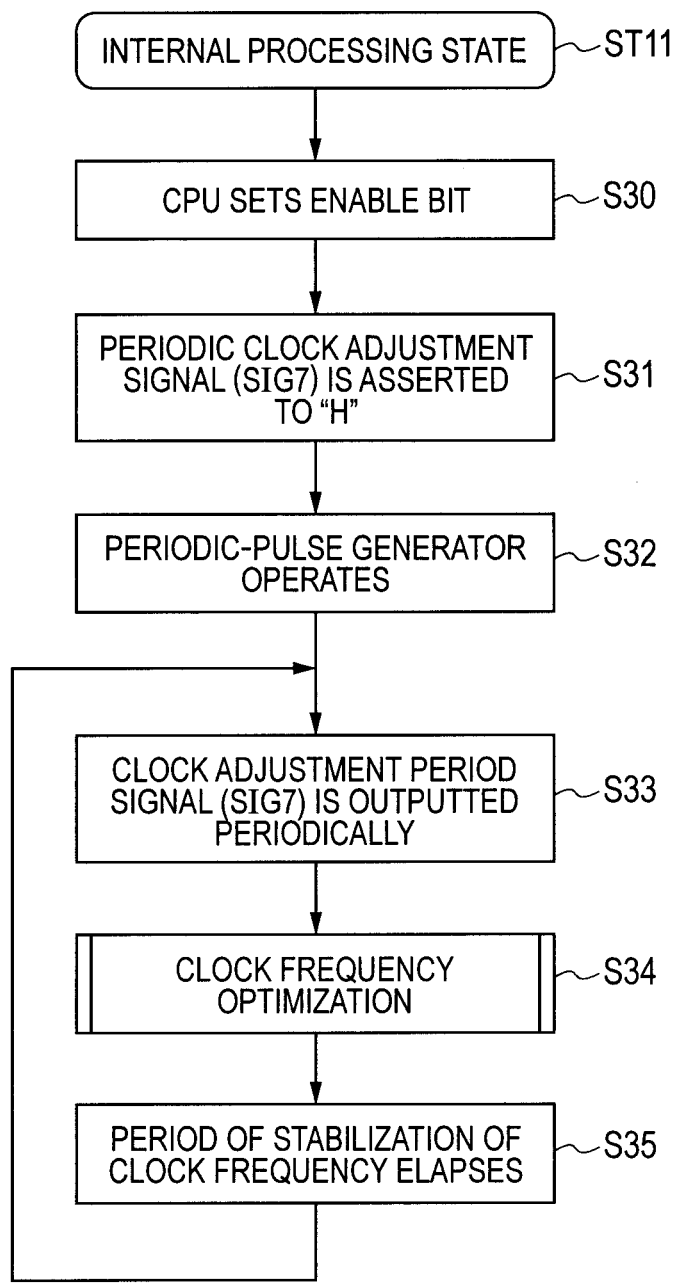
FIG. 16 is a flowchart illustrating the sequence of optimization processing of the clock signal frequency in FIG. 15.
Figure 17:
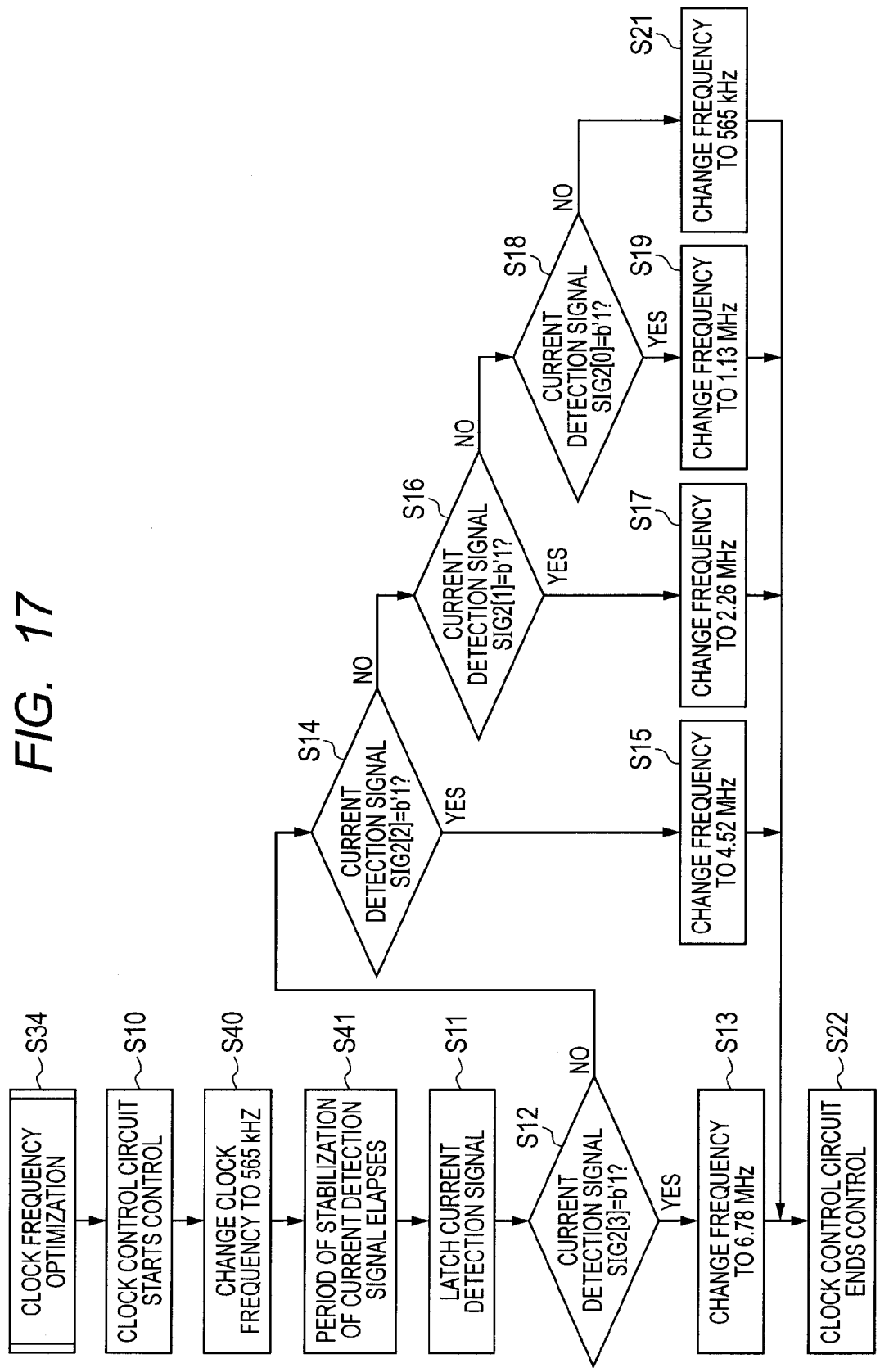
FIG. 17 is a flowchart illustrating a control flow dedicated to selection control of the clock frequency in FIG. 16.

FIG. 15 illustrates operation timing of optimization processing of the system clock signal frequency. FIG. 16 illustrates a sequence flowchart of optimization processing of the system clock signal frequency. FIG. 17 illustrates a control flowchart dedicated to selection control of the system clock frequency.

In FIG. 15, in consideration of changes and drops in induced electromotive force during transmission and reception, the frequency of the system clock signal SCLK of the data processing unit 6M in the low-power consumption state is set to 1.13 MHz, though not restricted. During the reception operation, the data processing unit 6M is set to be in the low-power consumption state. Upon the end of the reception operation, the transmission/reception unit 2 provides end notification data of the transmission or reception operation to the interface circuit 7 with the signal SIG3. Although not restricted, in response to the transmission/reception operation end notification, the data interface circuit 7 provides an interrupt request for releasing the low-power consumption state to the CPU 10. In response to the interrupt request, the CPU 10 first writes frequency setting data for selecting a frequency of 565 kHz into the register 13M, and sets the enable bit to assert the enable signal SIG6 (t1). Thereby, during the first pulse period of the signal SIG7, the data generation circuit 12M performs frequency optimization processing, based on an absolute surplus current detected by the current detection signal SIG2 sampled at that time. During the period of the signal SIG7, the system clock signal is changed to a frequency of 565 kHz as a given frequency (predetermined reference frequency). Since power consumption is unstable immediately after the frequency change, the frequency optimization processing for measuring the absolute surplus current is started after a lapse of a period of stabilization of an internal operating state after the frequency change. As a result of the optimization processing, the frequency of the system clock signal SCLK is changed to e.g. 6.78 MHz after time t2. During the next pulse period (t3 to t4) of the signal SIG7, in the same way, frequency optimization processing is performed based on an absolute surplus current detected by the current detection signal SIG2 sampled in a state where the frequency of the system clock signal SCLK is set to a minimum frequency of 565 kHz at the start thereof, and the frequency of the system clock signal SCLK is changed to e.g. 4.52 MHz after time t4. Since multiple pulse periods of the signal SIG7 are generated during the assertion period of the enable signal SIG6, the frequency optimization processing can be performed multiple times in the internal processing. Accordingly, it is possible to set a frequency higher or lower than the preceding frequency of the system clock signal SCLK, based on the absolute surplus current detected by the current detection signal SIG2. That is, a higher frequency is set if the absolute surplus current is large, and a lower frequency is set if the absolute surplus current is small, thereby making it possible to operate at an optimal frequency at that time. After the enable signal SIG6 is negated, frequency optimization processing is not performed.

In FIG. 15, the induced electromotive force during time t4 to time t5 is smaller than that during time t2 to time t3. This difference is detected by the difference between a surplus current value Ida obtained from a current detection result sampled during time t1 to time t2 and a surplus current value Idb obtained from a current detection result sampled during time t3 to time t4. This is because the clock signal frequency of the data processing unit 6M is uniformly set to the minimum frequency of 565 kHz at the time of detecting the surplus current values Ida and Idb so that the detected surplus current values Ida and Idb can be treated as absolute surplus values to the induced electromotive force. Consequently, it is possible to increase and decrease the frequency of the system clock signal SCLK in accordance with changes in induced electromotive force in the internal processing state (ACTIVE).

In FIG. 15, ST10 denotes the reception state, and ST11 denotes the internal processing state, and in the state ST11, the timings of execution of steps S30 to S35 in FIG. 16 are illustrated.

In FIG. 16, the end of a reception operation is notified, and an interrupt request for releasing the low-power consumption state is made to the CPU 10, so that the device 1 transitions to the internal processing state ST11. In the internal processing state, as clock frequency optimization processing, the CPU 10 first sets the enable bit in the register 13M (S30), thereby asserting the signal SIG7 (S31). In response thereto, the periodic-pulse generator 50 starts a generation operation of the clock adjustment period signal SIG7 (S32). When a pulse of the signal SIG7 is generated (S33), the clock control circuit 32 starts clock frequency optimization processing (S34). Further, there elapses a period of stabilization of the system clock signal SCLK with the clock frequency changed by the clock frequency optimization processing by the clock control circuit 32 (S35). After the stabilization, the CPU 10 performs data processing synchronously with the set frequency at stabilized timing. When the pulse of the signal SIG7 changes again, steps 34 and 35 are repeated.

The clock frequency optimization processing S34 illustrated in FIG. 17 is performed in the "H" period of the clock adjustment period signal SIG7. In FIG. 17 as in FIG. 9, although not restricted, the current detection signal SIG2 is comprised of 4 bits, and out of five frequencies, one frequency is selected for clock frequency optimization. FIG. 17 differs from FIG. 9 in the addition of steps 40 and 41. That is, when the clock adjustment period signal SIG7 becomes "H" so that the clock control circuit 32 starts to operate (S10), first the frequency of the system clock signal SCLK is changed to 565 kHz (S40), and there elapses a period of stabilization of the system clock signal SCLK with the changed frequency (S41). Immediately after the change to the reference frequency, the influence of consumption current by the operation at the preceding frequency might be included. On this account, the lapse of the period of stabilization of the system clock signal SCLK and the consumption current enables more accurate surplus current measurement. The others are the same as in FIG. 9, and hence their detail description is omitted.

According to the second embodiment described above, when the current detection unit 5 detects the surplus of the direct current generated in the voltage generation unit 20, the frequency of the operation clock signal SCLK of the data processing unit 6 is set to the predetermined reference frequency, e.g., the minimum frequency of 565 kHz; therefore, the power consumed by the data processing unit 6 at the time of detecting the surplus of the direct current is determined by the reference frequency, and the surplus of the direct current can be detected as an absolute surplus. Therefore, it is not necessary to gradually change the frequency while repeating the detection of the surplus current, and it is possible to determine the frequency of the system clock signal SCLK of the data processing unit 6 in a short time without a waste with precision. Further, it is possible to optimize the clock signal frequency by detecting the magnitude of the surplus of the direct current at arbitrary timing in accordance with an operation program of the CPU 10. Thereby, it is possible to reduce an internal data processing time (transaction time) in the contactless communication device 1M which performs contactless communication with outside. Further, since the current detection unit 5 detects the magnitude based on the surplus of the direct current generated in the voltage generation unit 20, it is not necessary to add a large circuit for the detection.

Third Embodiment

Figure 18:
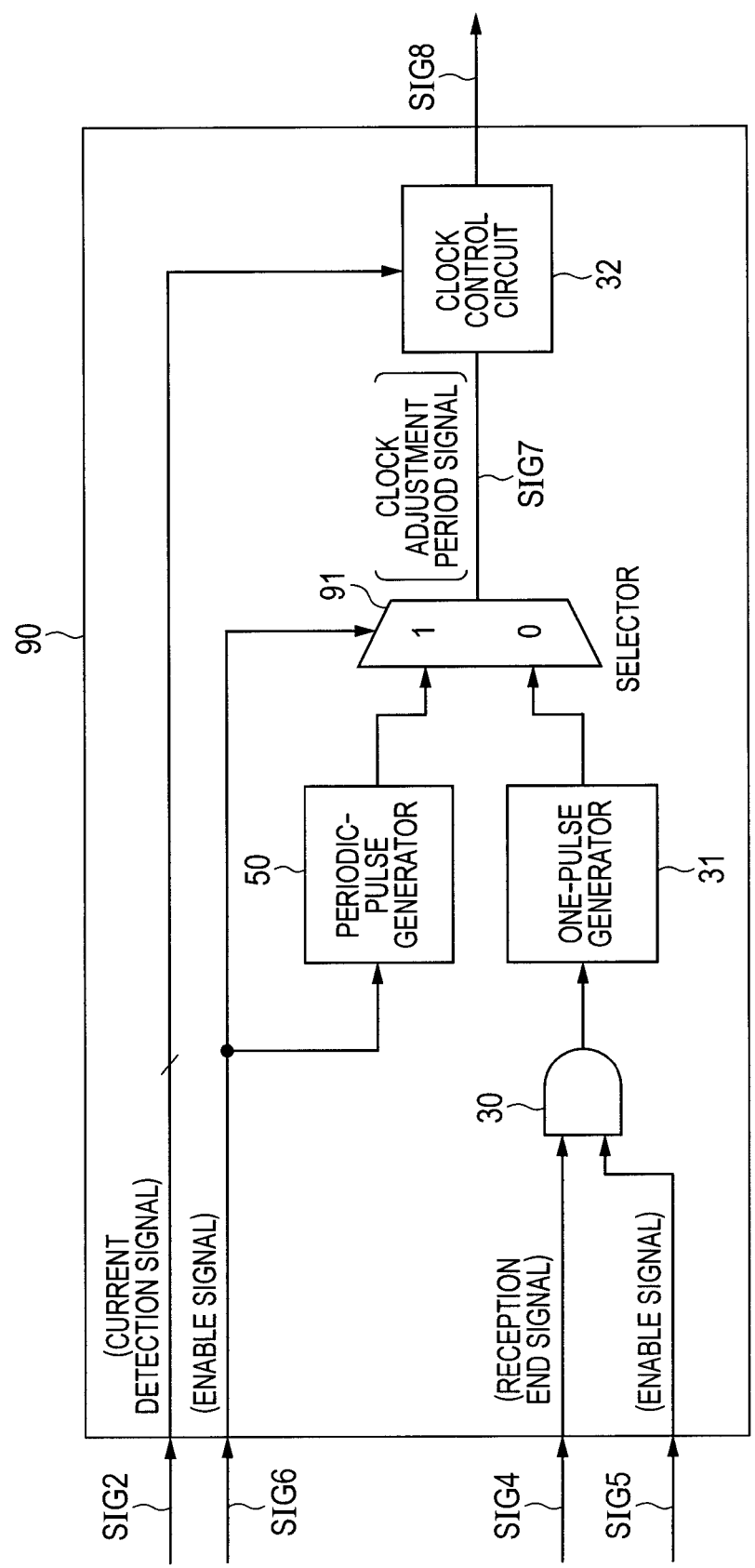
FIG. 18 is a block diagram showing an example of a data generation circuit in a contactless communication device that selectively uses either a configuration for clock frequency optimization processing according to the first embodiment or a configuration for clock frequency optimization processing according to the second embodiment.

It is also possible to configure the contactless communication device so as to selectively use either the configuration (FIG. 1) for the clock frequency optimization processing according to the first embodiment or the configuration (FIG. 13) for the clock frequency optimization processing according to the second embodiment. In this case, a data generation circuit 90 is configured by providing a selector 91 for selecting either output from the periodic-pulse generator 50 or output from the one-pulse generator 31, as illustrated in FIG. 18. The enable signal SIG6 is used as a selection signal for the selector 91. While the enable signal SIG6 is asserted, the selector 91 selects output from the periodic-pulse generator 50.

Fourth Embodiment

Figure 19:
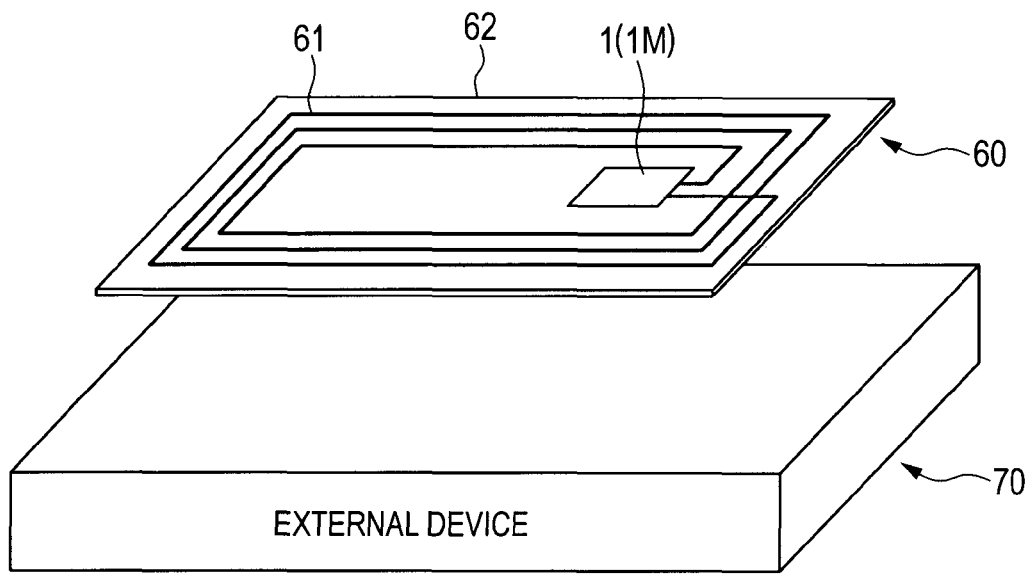
FIG. 19 is an explanation diagram illustrating an IC card as a contactless communication apparatus to which the contactless communication device is applied.

FIG. 19 illustrates an IC card 60 as a contactless communication apparatus to which the contactless communication device 1 or 1M is applied. The IC card 60 is implemented as a contactless IC card formed by e.g. a resin-molded printed circuit board. An antenna 61 which receives electromagnetic waves from an external device 70 is configured with a spiral coil formed by wiring of a printed circuit board 62. The contactless communication device 1 or 1M as a semiconductor integrated circuit device configured with a single IC chip is mounted on the printed circuit board 62, and the coil of the antenna 61 is coupled to the IC chip. The antenna 61 receives electromagnetic waves from the external device 70, and outputs a high-frequency alternating-current signal to the antenna terminals. The alternating-current signal is partially modulated by an information signal (data). This is typically applied to the so-called contactless IC card as the contactless communication apparatus which does not have a terminal for input/output from/to outside on the surface of the card. As a matter of course, this can be applied to a dual-type IC card having a contactless interface and a contact terminal for input/output.

According to the contactless IC card illustrated in FIG. 19 and the dual-type IC card, it is possible to set an optimal clock frequency to the data processing unit 6 in accordance with the contactless communication distance between the external device 70 and the IC card 60 and the strength of power from the external device 70.

Figure 20:
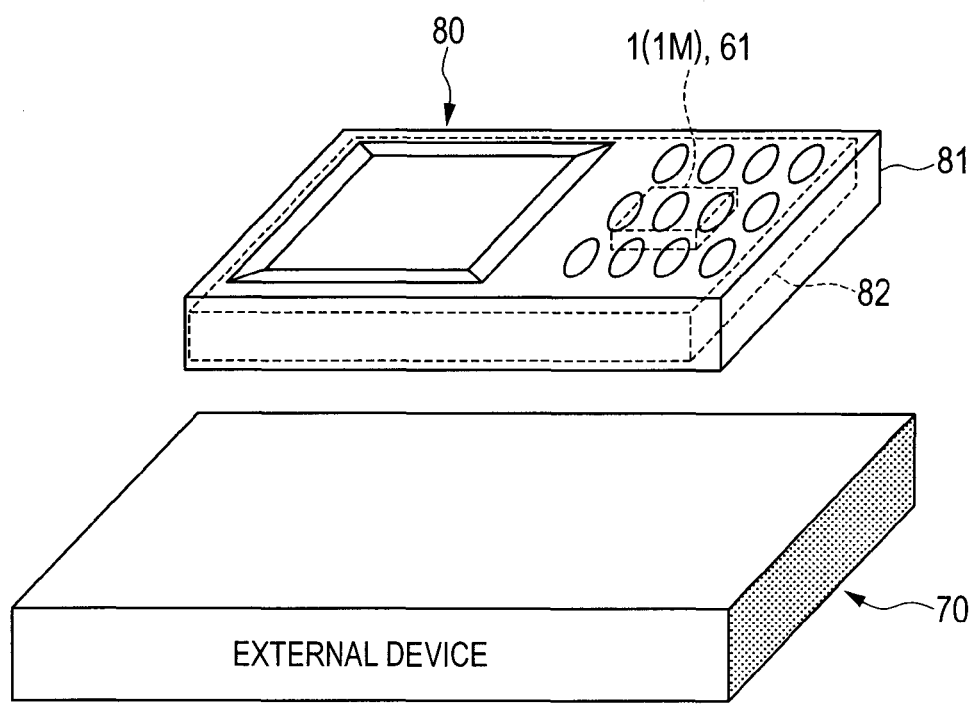
FIG. 20 is an explanation diagram illustrating a mobile information terminal as another contactless communication apparatus to which the contactless communication device is applied.

FIG. 20 illustrates a mobile information terminal 80 as another contactless communication apparatus to which the contactless communication device 1 or 1M is applied. The mobile information terminal 80 such as a cellular phone includes a case 81, an information processing system 82 for performing mobile communication control and its associated arithmetic processing, display processing, authentication processing, and the like, the contactless communication device 1 or 1M, and the antenna 61. The incorporation of the contactless communication device 1 or 1M into the mobile information terminal 80 such as a cellular phone enables contactless communication with the external device 70. This can be incorporated into a hand-held personal computer, a notebook computer, and other mobile information terminals. Since it is possible to set an optimal clock frequency in accordance with the contactless communication distance between the external device 70 and the mobile information terminal 80 and the strength of power from the external device 70, the contactless communication device 1 or 1M which uses the battery power of the mobile information terminal 80 can prevent the waste of the battery and ensure a reliable operation with a weak battery.

While the invention made above by the present inventors has been described specifically based on the illustrated embodiments, the present invention is not limited thereto. It is needless to say that various changes and modifications can be made thereto without departing from the spirit and scope of the invention.

For example, the current detection signal SIG2 is not limited to 4 bits, and may be comprised of a larger number of bits or a smaller number of bits. In the above examples, the system clock SCLK is generated based on the carrier clock CLK; however, the above frequency optimization can be performed based on a clock signal generated by a phase-locked loop PLL, an internal oscillator, or a crystal oscillator. In the description, the contactless communication device 1 or 1M is configured with a single chip, but also may be configured with multiple chips. In the description, the look-up table is used to determine an optimal frequency based on the current detection signal; however, the all or part may be arithmetically processed by the CPU in accordance with an arithmetic expression. Clock generation data may be provided directly to the clock generator from the data generation circuit. Although an interrupt controller is not shown in FIG. 1, it is needless to say that it is possible to adopt a configuration in which an interrupt is provided to the CPU through an interrupt controller from an interrupt requester.

What is claimed is:

1. A contactless communication device comprising:
a voltage generation unit for generating a predetermined source voltage from a direct current obtained by rectifying a signal inputted from an antenna terminal;
a transmission/reception unit which operates at the source voltage generated by the voltage generation unit and performs a transmission/reception operation through the antenna terminal;
a data processing unit which operates at the source voltage generated by the voltage generation unit and performs data processing on a signal received and a signal to be transmitted by the transmission/reception unit in synchronization with a clock signal; and
a detection unit for detecting a magnitude of a surplus of the direct current to the source voltage generated by the voltage generation unit,
wherein the data processing unit comprises a clock control unit for determining a frequency of the clock signal for the data processing based on the magnitude of the surplus detected by the detection unit in a state where a frequency of the clock signal is set to a predetermined reference frequency.

2. The contactless communication device according to claim 1, wherein the clock control unit selects the clock signal of a high frequency within a limit permitted by the magnitude of the surplus detected by the detection unit.

3. The contactless communication device according to claim 2, wherein the clock control unit comprises a look-up table for storing, for each detection result, frequency data of the clock signal selected corresponding to a detection result by the detection unit, and determines the clock signal frequency by referring to corresponding frequency data from the look-up table, using the detection result.

4. The contactless communication device according to claim 1,
wherein the data processing unit comprises an interface circuit for passing data to and from the transmission/reception unit and takes a low-power consumption state in which the clock signal is set to a low frequency during a transmission/reception operation performed by the transmission/reception unit, and
wherein in the low-power consumption state, in accordance with an instruction from the interface circuit, the clock control unit increases the frequency of the clock signal based on the magnitude of the surplus detected by the detection unit and releases the low-power consumption state.

5. The contactless communication device according to claim 4, wherein the frequency of the clock signal is set to the reference frequency in the low-power consumption state of the data processing unit.

6. The contactless communication device according to claim 1,
wherein the data processing unit comprises a central processing unit for executing an instruction, and
wherein the clock control unit performs processing for determining the frequency of the clock signal based on the magnitude of the surplus detected by the detection unit in a state where the frequency of the clock signal is set to the reference frequency in response to an instruction from the central processing unit.

7. The contactless communication device according to claim 6,
wherein the data processing unit comprises an interface circuit for passing data to and from the transmission/reception unit,
wherein the central processing unit sets control data in the clock control unit in response to an end notification of transmission/reception processing from the interface circuit, and
wherein the clock control unit performs a timer operation according to the set control data and performs processing for determining the frequency of the clock signal at a timer operation start time point and a subsequent time-out occurrence time point.

8. The contactless communication device according to claim 7, wherein the clock control unit comprises a timer control register in which an enable bit for the timer operation and a time-out interval as the control data are variably set by the central processing unit.

9. The contactless communication device according to claim 1,
wherein the clock control unit comprises:
a clock generator which receives a carrier clock signal generated by extracting a carrier component from the signal inputted from the antenna terminal, generate a plurality of clock signals having different frequencies by frequency-dividing the inputted carrier clock signal, and selects and outputs a clock signal of a frequency specified by clock selection data;
a clock selection data register which provides stored clock selection data to the clock generator; and
a data generation circuit for generating clock selection data based on the magnitude of the surplus detected by the detection unit, and
wherein the clock selection data register rewritably set clock selection data generated by the central processing unit or the data generation circuit.

10. The contactless communication device according to claim 9,
wherein the clock generator comprises:
a counter for repeating an operation of counting cycles of the carrier clock signal up to a value according to a frequency dividing ratio specified by the clock selection data; and
a logic circuit for generating a clock signal corresponding to the frequency dividing ratio in synchronization with a cycle of the carrier clock signal and in synchronization with a change to a predetermined count value of the counter in accordance with the frequency dividing ratio specified by the clock selection data.

11. The contactless communication device according to claim 1,
wherein the voltage generation unit comprises:
a rectifier circuit for rectifying the signal inputted from the antenna terminal; and
a regulator for generating the source voltage by regulating the direct current obtained by rectification by the rectifier circuit, and
wherein the detection unit generates, as the magnitude of the surplus, a signal that indicates, with a plurality of bits, a magnitude of a surplus current flowing through the regulator.

12. A contactless communication device comprising:
a voltage generation unit for generating a predetermined source voltage from a direct current obtained by rectifying a signal inputted from an antenna terminal;
a transmission/reception unit which operates at the source voltage generated by the voltage generation unit and performs a transmission/reception operation through the antenna terminal;
a data processing unit which operates at the source voltage generated by the voltage generation unit, performs data processing on a signal received and a signal to be transmitted by the transmission/reception unit in synchronization with a clock signal, and is put into a low-power consumption state in which the clock signal is set to a low frequency by an interface circuit during a transmission/reception operation performed by the transmission/reception unit; and
a detection unit for detecting a magnitude of a surplus of the direct current to the source voltage generated by the voltage generation unit,
wherein in response to an instruction from the interface circuit in the low-power consumption state, the data processing unit increases the frequency of the clock signal within a limit permitted by the magnitude of the surplus detected by the detection unit and releases the low-power consumption state.

13. A contactless communication device comprising:
a voltage generation unit for generating a predetermined source voltage from a direct current obtained by rectifying a signal inputted from an antenna terminal;
a transmission/reception unit which operates at the source voltage generated by the voltage generation unit and performs a transmission/reception operation through the antenna terminal;
a data processing unit which operates at the source voltage generated by the voltage generation unit and performs data processing on a signal received and a signal to be transmitted by the transmission/reception unit in synchronization with a clock signal; and
a detection unit for detecting a magnitude of a surplus of the direct current to the source voltage generated by the voltage generation unit,
wherein the data processing unit comprises a central processing unit for executing an instruction, sets a frequency of the clock signal to a predetermined reference frequency at timing specified by the central processing unit during data processing, acquires the magnitude of the surplus from the detection unit, and selects a high frequency of the clock signal within a limit permitted by the acquired magnitude of the surplus.

14. A contactless IC card comprising:
a board;
an antenna formed over the board; and
a contactless communication circuit having an antenna terminal coupled to the antenna,
the contactless communication circuit comprising:
a voltage generation unit for generating a predetermined source voltage from a direct current obtained by rectifying a signal inputted from the antenna terminal;
a transmission/reception unit which operates at the source voltage generated by the voltage generation unit and performs a transmission/reception operation through the antenna terminal;
a data processing unit which operates at the source voltage generated by the voltage generation unit and performs data processing on a signal received and a signal to be transmitted by the transmission/reception unit in synchronization with a clock signal; and
a detection unit for detecting a magnitude of a surplus of the direct current to the source voltage generated by the voltage generation unit,
wherein the data processing unit comprises a clock control unit for determining a frequency of the clock signal for the data processing based on the magnitude of the surplus detected by the detection unit in a state where a frequency of the clock signal is set to a predetermined reference frequency.

15. A mobile information terminal comprising:
a case;
an information processing system;
a contactless communication device; and
an antenna coupled to the contactless communication device,
wherein the contactless communication device comprises:
a voltage generation unit for generating a predetermined source voltage from a direct current obtained by rectifying a signal inputted from the antenna;
a transmission/reception unit which operates at the source voltage generated by the voltage generation unit and performs a transmission/reception operation through an antenna terminal;

a data processing unit which operates at the source voltage generated by the voltage generation unit and performs data processing on a signal received and a signal to be transmitted by the transmission/reception unit in synchronization with a clock signal; and a detection unit for detecting a magnitude of a surplus of the direct current to the source voltage generated by the voltage generation unit, and wherein the data processing unit comprises a clock control unit for determining a frequency of the clock signal for the data processing based on the magnitude of the surplus detected by the detection unit in a state where a frequency of the clock signal is set to a predetermined reference frequency.

* * * * *